(12) United States Patent
Siriwardane

(10) Patent No.: US 12,122,967 B1
(45) Date of Patent: Oct. 22, 2024

(54) PROCESS FOR PRODUCTION OF $H_2$ RICH SYNTHESIS GAS FROM COAL/STEAM WITH Cu—Fe-ALUMINA BASED CATALYSTS

(71) Applicant: United States Department of Energy, Washington, DC (US)

(72) Inventor: Ranjani Siriwardane, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 635 days.

(21) Appl. No.: 17/073,648

(22) Filed: Oct. 19, 2020

Related U.S. Application Data

(63) Continuation-in-part of application No. 15/478,427, filed on Apr. 4, 2017, now abandoned.

(51) Int. Cl.
  *C10J 3/10* (2006.01)
  *C10J 3/16* (2006.01)
  *C10J 3/72* (2006.01)

(52) U.S. Cl.
  CPC . *C10J 3/10* (2013.01); *C10J 3/16* (2013.01); *C10J 3/725* (2013.01); *C10J 2300/093* (2013.01); *C10J 2300/0959* (2013.01); *C10J 2300/0976* (2013.01); *C10J 2300/1823* (2013.01)

(58) Field of Classification Search
  CPC ....... C10J 3/10; C10J 3/16; C10J 3/725; C10J 2300/093; C10J 2300/0959; C10J 2300/0976; C10J 2300/1823

USPC .......................................................... 252/373
  See application file for complete search history.

(56) References Cited

U.S. PATENT DOCUMENTS

| 2005/0175533 | A1* | 8/2005 | Thomas | C01B 3/50 |
| | | | | 423/657 |
| 2016/0023190 | A1* | 1/2016 | Fan | B01J 20/06 |
| | | | | 502/328 |
| 2019/0388874 | A1* | 12/2019 | Lambert | B01J 21/12 |

FOREIGN PATENT DOCUMENTS

| WO | WO2014160223 | * | 10/2014 |
| WO | WO2018115344 | * | 6/2018 |

* cited by examiner

*Primary Examiner* — Smita S Patel
(74) *Attorney, Agent, or Firm* — Timothy L. Harney; Michael J. Dobbs; Brian J. Lally

(57) ABSTRACT

Materials, methods to prepare, and methods of use for producing an $H_2$ rich synthesis gas stream from coal free of nitrogen is described. One embodiment of the method comprises. The method includes an oxygen carrier at least partially reduced using a fuel in a reactor forming a reduced metal oxide comprised of first series—3d block-transition metals or mixture thereof. The reduced metal oxide is reacted with the solid fuel/steam to produce $H_2$ and $CO_2$/CO in the reactor; and the reduced metal oxide is added separately or simultaneously with a solid fuel while not impregnating the solid fuel with the reduced metal oxide.

3 Claims, 37 Drawing Sheets

PROCESS FOR PRODUCTION OF $H_2$ RICH SYNTHESIS GAS FROM COAL/STEAM WITH Cu—Fe-ALUMINA BASED CATALYSTS

CROSS-REFERENCE TO RELATED APPLICATIONS

This application is a continuation-in-part of, claims the benefit of and priority to U.S. Non-Provisional application Ser. No. 15/478,427 filed Apr. 4, 2017 titled PROCESS FOR PRODUCTION OF $H_2$ RICH SYNTHESIS GAS FROM COAL/STEAM WITH Cu—Fe-ALUMINA BASED CATALYSTS which is incorporated herein by reference in its entirety.

STATEMENT OF GOVERNMENT SUPPORT

The United States Government has rights in this invention pursuant to an employer/employee relationship between the inventors and the U.S. Department of Energy, operators of the National Energy Technology Laboratory (NETL).

FIELD OF THE INVENTION

One or more embodiments consistent with the present disclosure relate to producing a $H_2$ rich synthesis gas stream free of nitrogen from coal. More specifically, one or more embodiments relate to a novel catalytic process using reduced metal oxide/coal/steam to produce a $H_2$ stream free of nitrogen from coal. Chemical looping process with the metal oxide is used to produce heat for the process.

BACKGROUND

Production of syngas/$H_2$ from coal is very important because Hydrogen is used in many applications. $H_2$ has the highest energy content per weight of any known fuel and is an excellent energy carrier. It may be used in combustion engines and fuel cells, may be stored under high pressures or metal hydrides. Hydrogen has many applications such as chemical processing, petroleum recovery and refining, metal production and fabrication, aerospace, and fuel cells. Similarly, syngas also has many applications including fuels and chemical production. For example, the syngas may be used as a fuel in integrated gasification combined cycles (IGCC), or as a feedstock for producing $H_2$ or other hydrocarbon fuels. Current commercial hydrogen and syngas production methods include steam methane reforming, gasification of coal or bio-mass, electrolysis, and thermochemical process. The reactions involved in $H_2$ production from methane steam reforming are endothermic and heat is required for the reaction. Traditionally methane is combusted in air to provide heat for the reaction which contributes $CO_2$ emissions that needs to be separated prior to sequestration.

Syngas and hydrogen production from coal is commercially conducted via coal gasification process. The goal is to obtain a concentrated syngas stream which has a more energy value and may be used for many applications including production of pure hydrogen. However, conventional coal gasification processes are generally capital intensive and require significant amounts of parasitic energy. Typically, the gasification process involves partial coal combustion with either $O_2$ or air. When air is utilized, $N_2$ may enter the syngas, diluting the syngas and making the syngas extraction difficult. When $O_2$ is utilized, expensive oxygen production units tend to generate high parasitic losses. As a result, the development of alternative methods for syngas/$H_2$ production from coal are a significant area of current interest.

Use of steam for coal gasification may avoid the need for expensive air separation units to produce nitrogen free syngas. However, coal gasification with steam is a slow reaction and sufficient rates for a commercial process have not been achieved. Impregnation of coal with solutions of metal salts has been used (See G. Hermann, K. J. Ruttinger, paper titled Mechanism of iron catalyzed water vapor gasification of carbon (Carbon, Vol. 24, No. 4, pp 429-435, 1986)) but this process is not very practical because it involves chemical processing of coal with solutions containing catalysts. Therefore, it is advantageous to develop alternative processes to produce a concentrated stream of $H_2$ rich syngas with coal/steam. A process of using reduced metal oxide with coal/steam to produce $H_2$/syngas in the present disclosure addresses the issues encountered during coal gasification process.

In traditional gasification, heat or steam is added to the system by combusting some type of fuel in air. This not only costs energy, but results in a flue gas containing $CO_2$ and $N_2$. The $CO_2$ must be separated from the $N_2$ prior to any sequestration, further adding to the cost of $CO_2$ mitigation. Chemical looping combustion (CLC) is a combustion process that utilizes oxygen from an oxygen carrier such as a metal oxide for fuel combustion. Significantly, the $CO_2$ produced via CLC is sequestration-ready, not requiring any further processing or its associated costs prior to storage. It is advantageous to combine the CLC process to produce heat for the syngas production process with coal/steam/reduced metal oxide. The current disclosure also includes the use of reduced metal oxide to produce $H_2$ rich syngas from coal/steam while using the same metal oxide as an oxygen carrier for the CLC to produce heat for the process.

Production of syngas/$H_2$ from coal is usually conducted via a coal gasification process. To produce syngas not diluted with nitrogen, oxygen, after an expensive air separation process, is introduced to the coal gasifiers. Chemical looping gasification of coal using oxygen from oxygen carriers such as metal oxide has been reported in lab scale studies for production of synthesis gas. WO Patent 2008/036902 A2 to White et al titled Cyclic catalytic upgrading of chemical species using metal oxide materials and U.S. Pat. No. 7,083,658 B2 to Andrus et al. titled Hot Solids Gasifier with CO2 Removal and Hydrogen Production describes processes for coal gasification using various oxygen carriers. Siriwardane et al.'s (Ranjani Siriwardane, Jarrett Riley, Hanjing Tian and George Richards) article titled "Chemical looping gasification with calcium ferrite and barium ferrite via solid-solid reactions" (Applied Energy 165 (2016) pp 952-966) also reported unique oxygen carriers, Ba ferrite and Ca ferrite which react with coal directly to produce synthesis gas but do not react with synthesis gas. Guo et al. (Guo Q, Cheng Y, Liu Y, Jia W, Ryu H. Coal chemical looping gasification for syngas generation using an iron-based oxygen carrier. A paper published in Ind. Eng. Chem. Res. 2014; 53:78-86) reports use of iron based oxygen carriers for coal gasification. These processes use metal oxides or salts in the oxidized form to provide oxygen for gasification but do not use the reduced form of metal oxide as described herein. In addition, in these reported processes the oxygen carriers after each gasification step are oxidized with air and the process operates in a cyclic manner while the process reported herein operates continuously with the reduced metal oxide. It has been difficult to produce syngas with high selectivity due to fuel combustion with the previously reported oxidized oxygen carriers.

Direct hydrogen production from coal via chemical looping process has been investigated by researchers in the past. A process that is widely reported involves reduction of the metal oxide with synthesis gas first and subsequent reaction of the reduced oxygen carrier (e.g. iron oxide) with steam to produce H2 (See U.S. Pat. No. 7,767,191 B2 to Thomas et al. titled Combustion looping using composite oxygen carriers). This process requires an air separation unit for initial coal gasification to obtain nitrogen free synthesis gas from coal which is used for the initial deep reduction of iron oxide. Then steam is introduced to the reduced iron oxide for production of H2 from steam decomposition process where the reduced metal gets oxidized by the oxygen generated from steam decomposition. The process is cyclic since the oxidized metal oxide must be reduced again with syngas for the subsequent steam decomposition cycle.

BACKGROUND

This disclosure provides materials, methods to prepare, and methods of use for producing an $H_2$ or synthesis gas stream free of nitrogen from solid carbonaceous fuels, such as coal, coke, coal and biomass char, and the like. One embodiment of the method comprises an oxygen carrier (e.g. metal oxide—MO) at least partially reduced (MxOy) using coal/steam or other reducing agents such as methane or hydrogen in a fluidized bed or fixed bed reactor forming a reduced metal oxide as shown in reaction [I]

$$MO+Fuel\ MxOy\_+CO_2 \quad [I]$$

and the reduced metal oxide is catalyzing the reaction of coal/steam to produce $H_2$ and $CO_2/CO$ as shown in reactions [2] and [3] which may be facilitated via reactions [4], [5] and [6].

$$C+H_2O \rightarrow CO+H_2 \quad [2]$$

$$C+2H_2O \rightarrow CO_2+2H_2 \quad [3]$$

$$2H_2O \rightarrow 2H_2+O_2 \quad [4]$$

$$C+O_2 \rightarrow CO_2 \quad [5]$$

$$C+0.5O_2 \rightarrow CO \quad [6]$$

The reduced metal oxide does not have to be in direct contact with coal and the process may even be operated in a fluidized bed reactor. Further the reduced oxygen carrier may comprise first series 3d block transition metal (T) oxide or mixed metal oxides such as $T_xO_y$—$Z_pO_q$ or ZpTxOy where Z is at least one selected from transition metals, alkali or alkali earth metals or Ce, Zr, V, Mo, Sn and x>0, y>0, p>0, q>0. In addition, an inert support may also be used. $H_2$ rich syngas production temperatures with reduced metal oxide/coal/steam is above 500° C. and the syngas concentration is more than 50% vol. % of the gas. If pure $H_2$ is required further processing of $H_2$ rich syngas with commercial water gas shift reactor followed by $CO_2$ separation may be used and this process is easy because the $H_2$ rich syngas stream is not diluted with nitrogen.

Embodiments of the metal ferrite oxygen carriers or reduced metal catalysts disclosed are further demonstrated and described in the following description with reduced iron oxide and reduced mixed metal oxide-inert support, such as a metal aluminate catalyst, $CuO$—$Fe_2O_3$—$Al_2O_3$, for example.

Embodiments relate to a method for producing an $H_2$ stream free of nitrogen from coal, the method comprising an oxygen carrier at least partially reduced using a fuel in a reactor forming a reduced metal oxide comprised of first series—3d block-transition metals or mixture thereof. The reduced metal oxide is reacted with the solid fuel/steam to produce $H_2$ and $CO_2/CO$ in the reactor; and the reduced metal oxide is added separately or simultaneously with a solid fuel while not impregnating the solid fuel with the reduced metal oxide.

Embodiments may include the metal oxide comprises the first series—3d block-transition metal (T) oxide or mixed metal oxides such as $T_xO_y$—$Z_pO_q$ or ZpTxOy where Z is a single or mixed metal oxide selected from transition metals, alkali, alkali earth metals or Ce, Zr, V, Mo, Sn and x>0, y>0, P>0, Q>0; the metal oxide comprises a hematite or CuO—$Fe_2O_3$ mixture which may be reduced to $Cu^{+1}$, $Cu^0$, $Fe^0$, $Fe^{+2}$, $Fe^{+3}$; and/or the reduced metal oxide comprises reduced forms of transition metal oxides, alkali metal oxides and Ce, Zr, V, Mo, Sn.

Embodiments includes an inert support may be combined with the metal oxide (metal oxide/oxygen carrier), wherein the inert support comprises from about 5 wt. % to about 60 wt. % of the metal oxide and the inert support may comprise alumina, silica, alumina silicates, clay, titania, or mixtures thereof. The inert support may interact to form compounds with metal oxides forming aluminates, silicates, titanates of transition metals such as iron aluminates and copper aluminates.

Embodiments may include the solid fuel comprises coal, coke, char.biomass or bio fuel; or the fuel used for the initial reduction of the metal oxide comprises methane, hydrogen, syngas, coal, coke, char, bio mass, or biofuel.

One or more embodiments include the $H_2$ rich syngas product stream is at least >50% vol. of the product stream. The reactor may comprise a fluidized bed, fixed bed, moving bed or spout bed. The reaction temperature of the reduced metal, coal and steam is greater than 500° C. Further the steam required for the process is generated from heat from a chemical looping combustion of fuel with metal oxide.

Still other embodiments relate to a method for producing syngas from reduced metal oxide/steam/solid fuel combined with heat from a chemical looping combustion of metal oxide wherein the process comprises reducing the metal oxide or oxygen carrier selected from a transition metal oxides or a mixture there of with a gaseous or solid fuel in the fuel reactor; transferring some portion of the reduced metal oxide from a fuel reactor to a catalytic reactor; supplying steam and solid fuel to the catalytic reactor containing the reduced metal oxide to produce $H_2$ rich syngas; transferring some portion the reduced carrier from the fuel reactor to an oxidizing reactor; supplying the oxidizing gas to the oxidizing reactor, thereby generating heat and a re-oxidized oxygen carrier; transferring heat from the oxidizing reactor to the catalytic reactor; and transferring the re-oxidized oxygen carrier from oxidizing reactor to the fuel reactor. Yet another embodiment relates to a method of producing synthesis gas rich of hydrogen from sold carbonaceous fuel comprising delivering a metal oxide to a reactor, where the metal oxide comprises iron oxide, CuO—$Fe_2O_3$, CuO—$Fe_2O_3$-Alumina or thereof >5 wt. %; partially or fully reducing the metal oxide with a solid or gaseous fuel; delivering a solid fuel to the reactor; delivering steam to the reactor; converting some portion of the solid fuel and the steam to a hydrogen rich synthesis gas and maintaining the reactor above 500° C.; continuing the delivery of steam and solid fuel to the reactor; and withdrawing product stream from the reactor, where the gaseous product comprises product stream, and where at least >50 vol. % of the product stream consists of $H_2$ and CO.

BRIEF DESCRIPTION OF THE DRAWINGS

These and other features, aspects, and advantages of the multiple embodiments of the present invention will become better understood with reference to the following description, appended claims, and accompanied drawings where:

DESCRIPTION OF THE EMBODIMENTS

Figure 1:
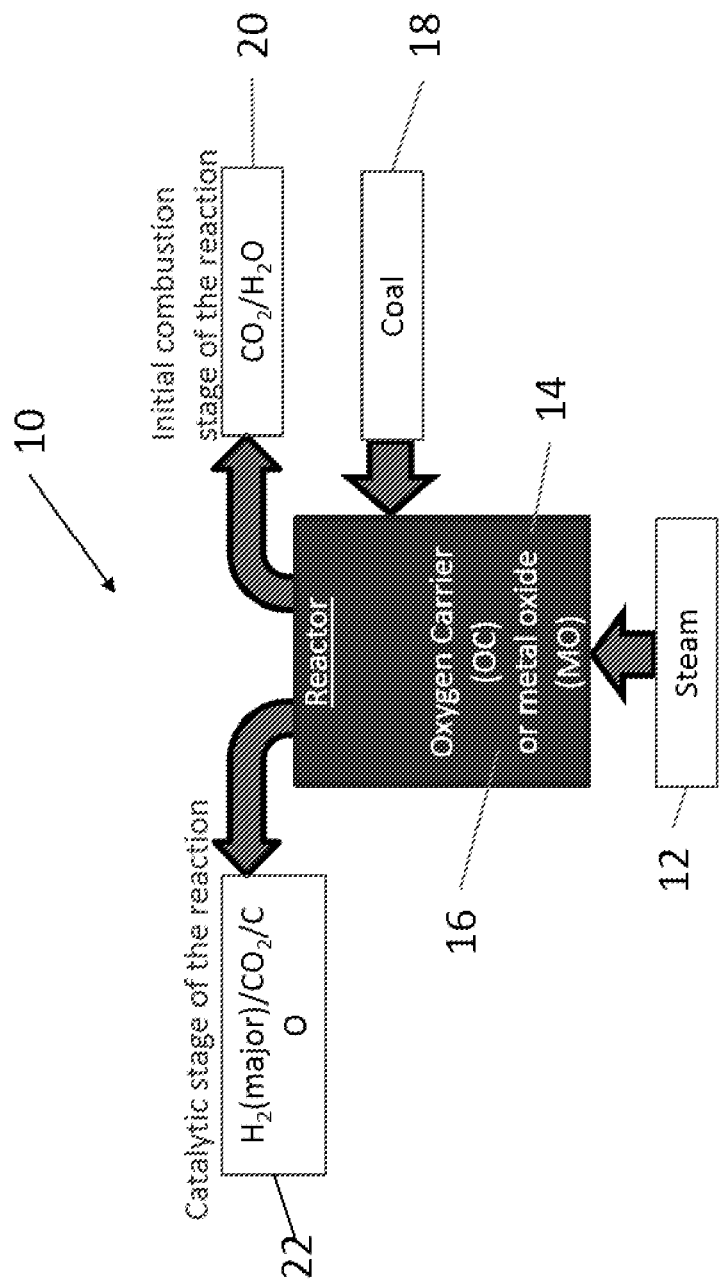
FIG. 1 depicts a continuous process for producing $H_2$ rich syngas by addition of steam, coal to the metal oxide (MO)

The following description is provided to enable any person skilled in the art to use the embodiments of the invention and sets forth the best mode contemplated by the inventor for carrying out the invention. Various modifications, however, will remain readily apparent to those skilled in the art, since the principles of one or more embodiments of the invention are defined herein specifically to provide description of ionic inorganic materials, methods of their preparation, and methods for using such materials. One or more embodiments relate to producing a $H_2$ rich synthesis gas stream free of nitrogen from coal. More specifically, one or more embodiments relate to a catalytic process combined with or without chemical looping combustion to produce a $H_2$ rich synthesis gas stream free of nitrogen from coal.

One or more embodiments relates to a method for producing a syngas from a reduced metal oxide/oxygen carrier, steam and solid fuel combined with heat from a chemical looping combustion. The method includes reducing the metal oxide/oxygen carrier forming the reduced metal oxide/oxygen carrier, wherein the reduced metal oxide/oxygen carrier is selected from a transition metal oxide or a mixture there of with a gaseous or solid fuel in the fuel reactor; transferring some portion of the reduced metal oxide from fuel reactor to a catalytic reactor; supplying steam and solid fuel to the catalytic reactor containing the reduced metal oxide to produce $H_2$ rich syngas, wherein the reduced metal oxide catalyst enhances the $H_2$ rich syngas production rate with coal and steam; transferring some portion the reduced carrier from the fuel reactor to an oxidizing reactor; supplying the oxidizing gas to the oxidizing reactor, thereby generating heat and a re-oxidized oxygen carrier; transferring heat from the oxidizing reactor to the catalytic reactor; and transferring the re-oxidized oxygen carrier from oxidizing reactor to the fuel reactor.

Yet another embodiment relates to a method for producing a syngas from reduced metal aluminate catalyst, steam, solid fuel. The method includes reducing the metal aluminate catalyst selected from one or more transition metal aluminates or a mixture of transition metal aluminates using at least one of a gaseous and solid fuel, producing a reduced metal aluminate catalyst; continuously delivering steam and solid fuel to the reduced metal aluminate catalyst; and supplying heat, producing a continuous stream of $H_2$ rich syngas.

Yet another embodiment relates to a method of producing a synthesis gas rich in hydrogen from solid carbonaceous fuel. The method includes delivering a metal aluminate to a reactor, where the metal aluminate is selected from the group comprising iron aluminate, copper-iron-manganese aluminate and copper-iron-aluminate; partially or fully reducing the metal aluminate with a solid or gaseous fuel; delivering a solid fuel to the reactor; delivering steam to the reactor; converting some portion of the solid fuel and the steam to a hydrogen rich synthesis gas and maintaining the reactor above 500° C.; continuing the delivery of steam and solid fuel to the reactor; and withdrawing product stream from the reactor, where the gaseous product comprises product stream, and where at least >50 vol. % of the product stream consists of $H_2$ and CO.

One or more methods of the present invention may include the reduced metal aluminate is selected from the group comprising $Cu^{+1}$, $Cu^0$, $Fe^0$ and, $Fe^{+2}$. The heat may be supplied by combustion of at least one or more of a fuel, chemical looping combustion, a microwave heating source and solar energy. The fuel comprises a solid carbonaceous fuel selected from the group comprising coal, coke, char. biomass and biofuels.

Still other applications may include the reactor comprises a fluidized bed, fixed bed, moving bed or spouted bed; and the reaction temperature of reduced metal aluminate, coal and steam is greater than 500° C. In one or more embodiments the $H_2$ rich syngas product stream is at least >50% vol. of $H_2$ and CO.

Embodiments relate to a catalytic process to produce $H_2$ rich syngas directly from coal/steam as shown in FIG. 1. In this process 10 coal 18/steam 12 is continuously added to a metal oxide or oxygen carrier 14 in reactor 16. During the initial stages of the coal 18 addition, coal is combusted from the oxygen in the metal oxide to form $CO_2/H_2O$ 20 while the oxygen carrier gets reduced. Further addition of coal/steam to the reduced oxygen carrier produces $H_2$ (major) and $CO_2/CO$ (minor) 22. Hydrogen rich syngas production rate in this process 10 with reduced metal oxide/coal/steam is higher than that with either coal/steam gasification without metal or water splitting reaction with steam/reduced oxygen carrier without coal. Other carbonaceous solid fuels such as, biomass, coke and like may be used instead of coal. For the initial reduction of the metal oxide oxygen carrier gaseous fuels such as methane, hydrogen or syngas may be used. This process 10 differs from the catalytic steam gasification process reported in the literature in which coal is impregnated with the solutions of metal salts.

Embodiments of the current process 10 have been demonstrated in a fluidized bed reactor where the contacts between the reduced metal oxide and coal is minimal during the $H_2$ production process. The reduced oxygen carrier which does not get oxidized during the process may be used continuously for $H_2$ rich syngas production as a catalytic process. Hence this process has a major advantage over $H_2$ production process from steam decomposition with reduced metal which is operated in a cyclic manner because the metal gets oxidized and it has to be reduced prior to the next cycle.

Also, unlike the $H_2$ production from water splitting process with reduced iron oxide, one of the major advantages of the process is that it does not require an air separation unit for production of nitrogen free synthesis gas for initial reduction. The reduced oxygen carrier does not have to be in contact with the coal. The preferable temperatures for the catalytic process in the reactor 16 of FIG. 1 is greater than 500° C.

Figure 2:
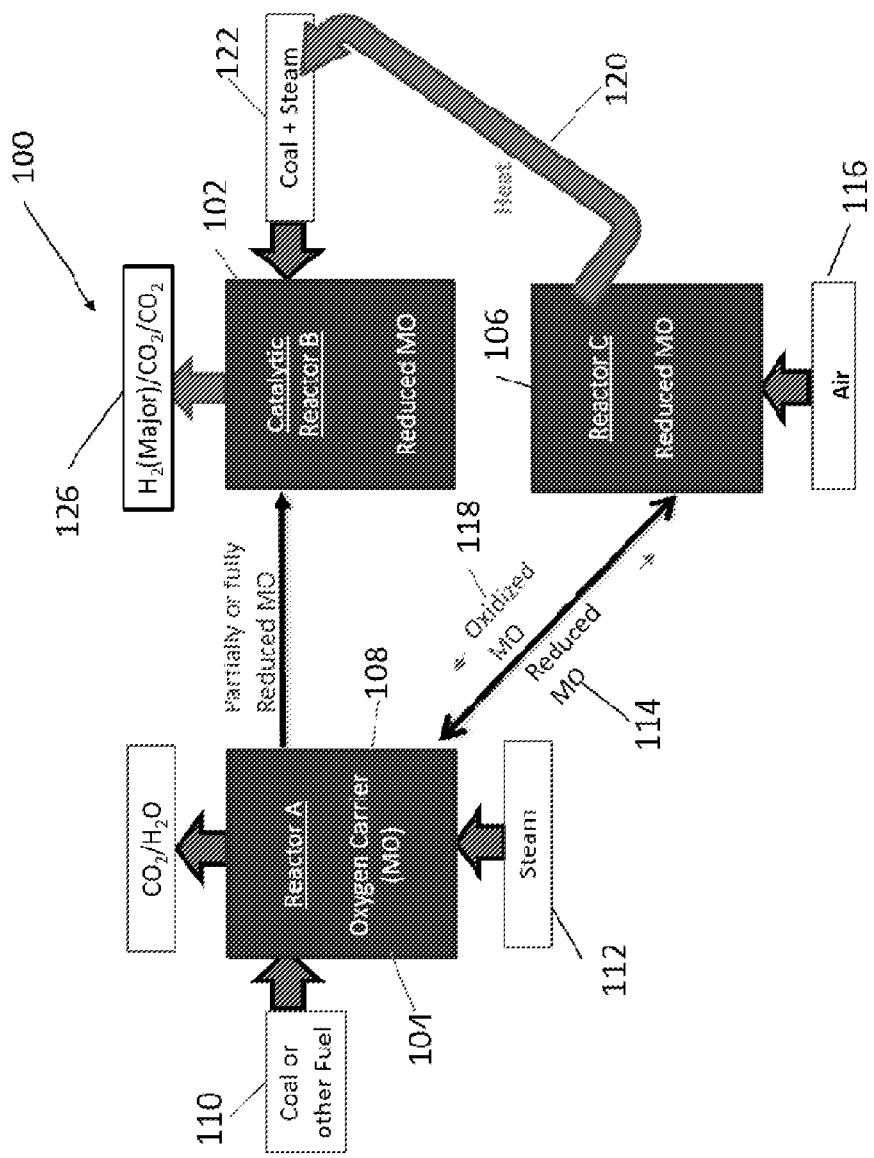
FIG. 2 depicts catalytic production of $H_2$ rich syngas with reduced metal oxide/coal/steam using heat from chemical looping process with the same oxygen carrier.

Steam is required for the coal/steam/reduced oxygen carrier and the heat to produce steam may be obtained from the CLC of the same oxygen carrier. Embodiments of the invention relate to a process 100 with a three-reactor system (102, 104 and 106) shown in FIG. 2. Steam 112 is necessary for the catalytic process 100 in reactor B 102 may be produced by the chemical looping reactions in reactors A 104 and C 106 as shown in FIG. 2. The metal oxide or the oxygen carrier 108 in reactor A 104 is reduced by coal 110/steam 112. Other fuels such as methane, hydrogen, biomass, coke and like may be used for the reduction of oxygen carrier in reactor A 104. The reduced oxygen carrier 114 is transferred to the reactor C 106 in which air 116 is introduced for oxidation of the reduced oxygen carrier. The oxygen carrier 114 and 118 is transferred between reactors A 104 and C 106 for the CLC process 100.

The oxidation reaction in reactor C 106 is exothermic and the heat 120 generated from the reactor C 106 may be used for production of steam that is required in the catalytic reactor B 102. The reduced oxygen carrier 114 from reactor A 104 is transferred to the catalytic reactor 102 in which coal/steam c is continuously added to produce $H_2$ (major) and $CO_2/CO$ 126. Other carbonaceous fuels such as coke, bio mass and like may also be used instead of coal. The temperature in the reducing reactor A 104 is sufficient to reduce some portion of the metal oxide oxygen carrier while the temperature of the oxidizing reactor C 106 is sufficient to oxidize some portion of reduced metal oxide. In the catalytic reactor B 102, the reduced oxygen carrier remains reduced while coal-steam via the catalytic process produces syngas containing a high $H_2$ concentration. The reduced oxygen carrier does not have to be in contact with the coal. The preferable temperatures for the catalytic process in the reactor B 102 is greater than 500° C.

The oxygen carrier may comprise 3d block-transition (T) metal oxide or mixed metal oxides such as $T_xO_y$—$Z_pO_q$ where Z is a single or mixed metal oxides selected from transition metals, alkali or alkali earth metals or Ce, Zr, V, Mo, Sn and x>0, y>0, p>0, q>0. In addition, an inert support may also be used. The oxygen carrier (metal oxide) may be fully or partially reduced for catalytic production of $H_2$ (high) and $CO_2/CO$ with coal/steam. For example, reduced iron oxide component may contain Fe metal or an iron oxide such as FeO, $Fe_3O_4$ and reduced copper oxide may contain $Cu^{+1}$ or $Cu^0$.

The syngas stream with high $H_2$ concentration produced by coal/steam/reduced metal oxide may be further processed in a commercial water gas shift reactor followed by a $CO_2$ separation unit such as pressure swing process to obtain pure hydrogen.

Oxygen carriers $CuO$—$Fe_2O_3$-alumina, hematite from Cliffs Natural Resources, Canada, and AMIRON-OH 48 hematite from Applied Minerals, N.Y. were used in this study. The oxygen carrier, $CuO$—$Fe_2O_3$-alumina was prepared using the commercial spray drying method at Nexceris Inc. and this oxygen carrier has shown promising results for chemical looping combustion. See e.g. Siriwardane et al., "Fluidized bed testing of commercially prepared MgO-promoted hematite and $CuO$—$Fe_2O_3$ mixed metal oxide oxygen carriers for methane and coal chemical looping combustion", *Applied Energy*, 157 (2015) 348-357, 2015. The composition of the oxygen carrier was 30 wt. % CuO, 30 wt. % $Fe_2O_3$, and 40 wt. % alumina, and the particle size range was 74-250 μm. Natural mineral hematite had a particle size of 300-600 μm.

Coals used in the experiments were Illinois #6 (High volatile bituminous coal), Rosebud coal (Sub bituminous coal) and Wyodak coal (Sub bituminous coal).

The temperature programmed reaction (TPR) studies were carried out using a fluidized bed reactor manufactured by Autoclave Engineers HR-160 Reactor Assembly (Model #5010-2377/HR-160). The oxygen carrier/coal bed height was 7.62 cm, and the diameter was 6 cm. The reactor column was made from Inconel SB-564 to withstand temperatures up to 900° C. A ceramic porous plate with 15-40 μm pores was used as the gas distributor. The setup is equipped with three electrical heaters installed around the reactor to heat the reactor to the target temperature of 850° C. Prior to the tests, either 20 g each of coal and 322 g $CuO$—$Fe_2O_3$-alumina oxygen carriers were mixed. Then the mixture was heated from 25° C. to 850° C. at a heating rate of 4° C./min in helium at a flow rate of 7.8 SLPM (24×MFV of Fe—Cu/alumina at 850° C.).

Then the sample was maintained at 850° C. for 0.5 hours in helium. During the experiments, 15-30 vol. % steam was introduced either during the temperature ramp beginning at 300° C. or after the isothermal dwell at 850° C. After the reduction of the oxygen carrier with coal, the sample was cooled to ambient in He and additional 10 g of coal was added to the already reduced oxygen carrier. The 10 g coal addition TPR cyclic process was continued until 50-60 g of coal was consumed. The reactor effluent was monitored using a Pfeiffer Omnistar mass spectrometer. For the tests with Applied Minerals hematite the flow rate was 7.8 SLPM and for Cliffs hematite it was 11.6 SLPM. The amounts of Cliffs and Applied Minerals hematite used in the Fluidized bed tests were 545 g and 322 g respectively.

In some experiments, initial oxygen carrier reduction was conducted using. $H_2$ for the first part of the experiment the reactor was loaded with oxygen carrier, and heated from ambient temperature to 700° C. in Helium. At 700° C., 10% $H_2$ in He was introduced until the oxygen carrier was completely reduced. After the reduction with $H_2$, reactor was cooled to ambient temperature in He and 10 g of coal was added. Then the coal/reduced oxygen carrier was heated to 850° C. and kept isothermal for 30 mins. and 15% steam was added. Two blank experiments were conducted: First test by reducing the oxygen carrier at 700° C. with 10% $H_2$/He, then heating up the reduced oxygen carrier to 850° C. (no coal addition) and introducing 15% steam at 850° C. and the second blank test by heating coal to 850° C. (no oxygen carrier) and introducing steam at 850° C.

In some experiments, initial reduction was conducted with methane and after the reduction with methane the oxygen carrier was cooled to ambient temperature, mixed with coal and temperature ramp was conducted with steam/helium.

Figure 3A:
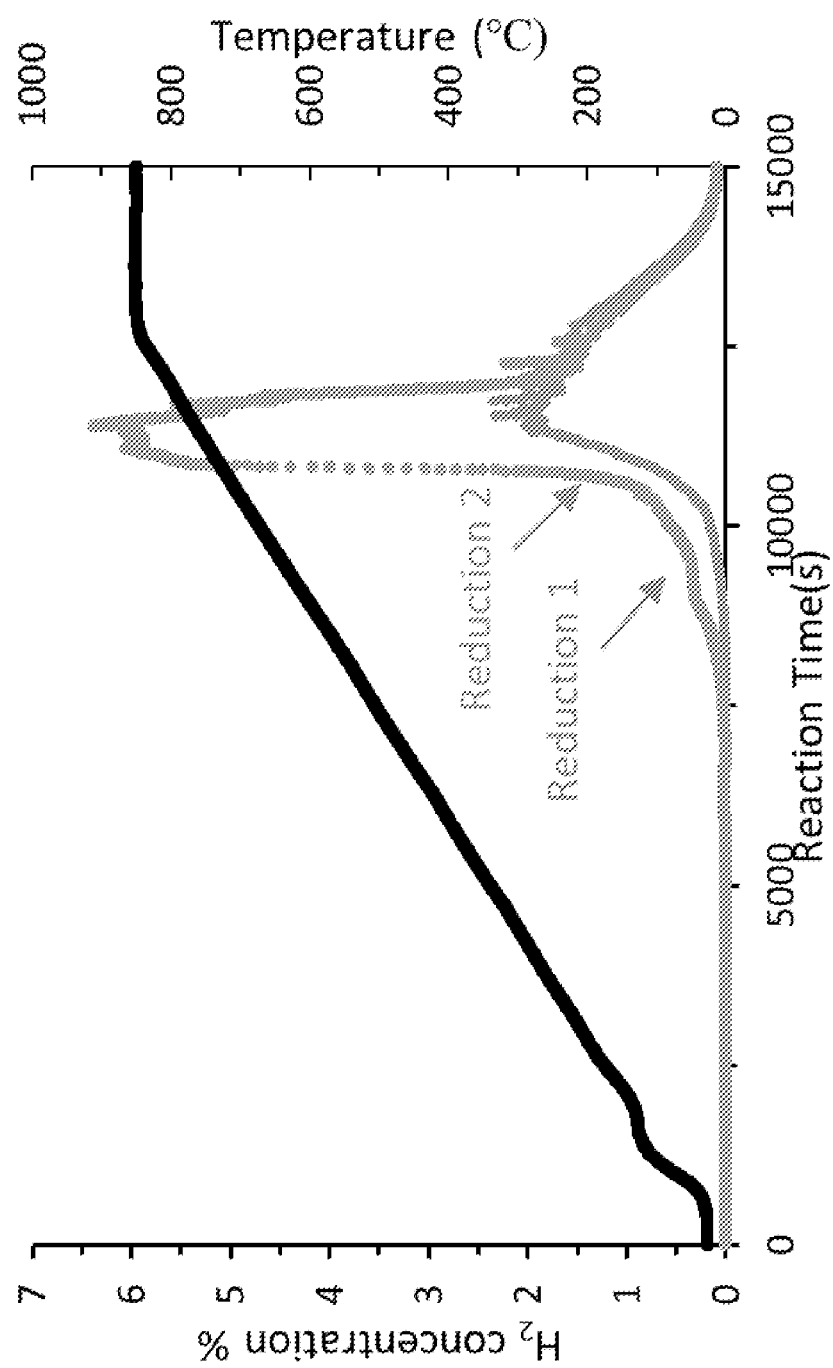
FIG. 3A depicts a graph illustrating the concentration of $H_2$ during temperature programmed reaction (TPR) of $CuO$—$Fe_2O_3$-$Al_2O_3$ with 30% steam/coal: Reduction 1: 20 g Wyodak coal/$CuO$—$Fe_2O_3$—$Al_2O_3$, Reduction 2: 10 g coal/reduced $CuO$—$Fe_2O_3$—$Al_2O_3$.
Figure 3B:
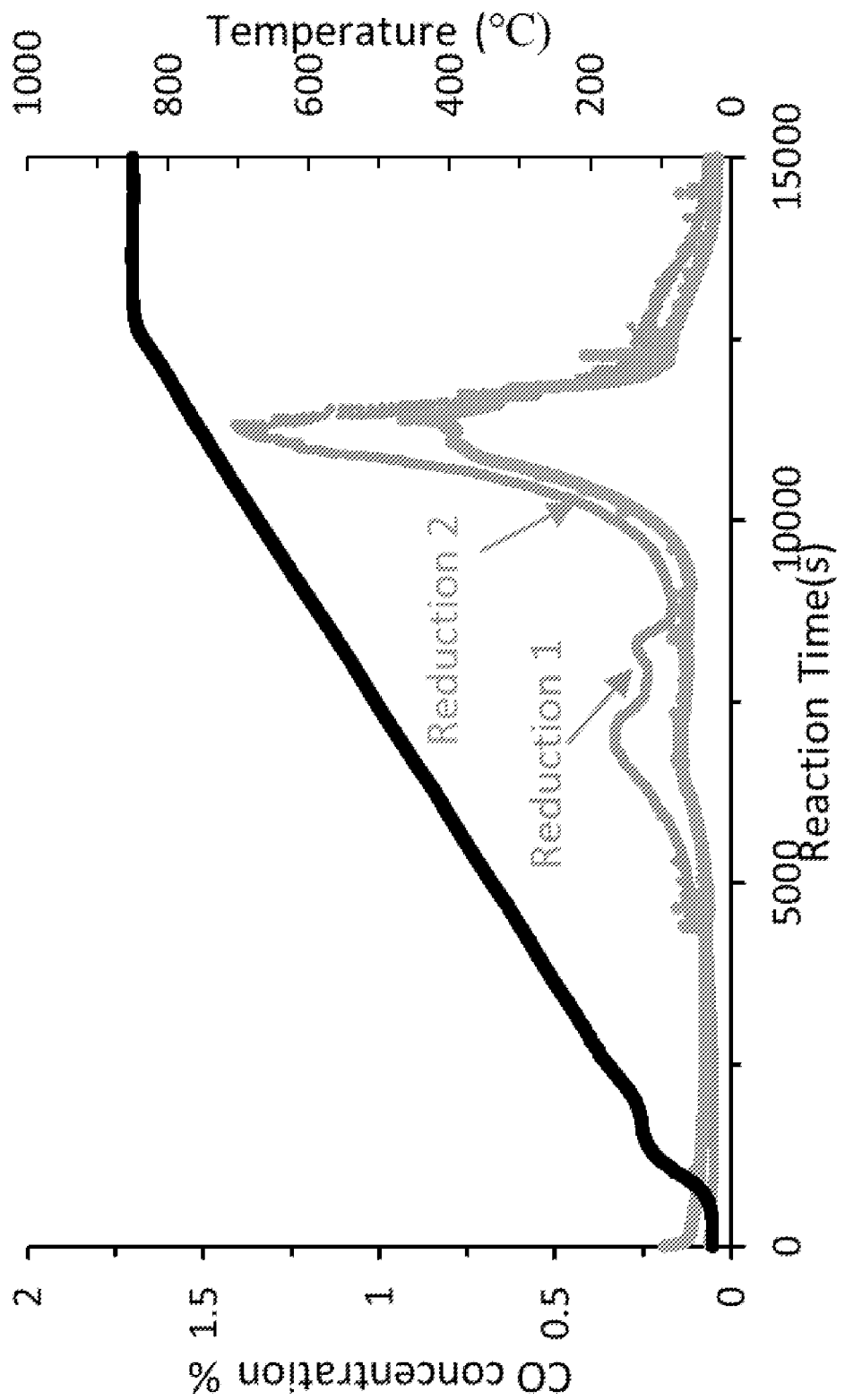
FIG. 3B depicts a graph illustrating the concentration of CO during temperature programmed reaction (TPR) of $CuO$—$Fe_2O_3$-$Al_2O_3$ with 30% steam/coal: Reduction 1: 20 g Wyodak coal/$CuO$—$Fe_2O_3$—$Al_2O_3$, Reduction 2: 10 g coal/reduced $CuO$—$Fe_2O_3$—$Al_2O_3$.
Figure 3C:
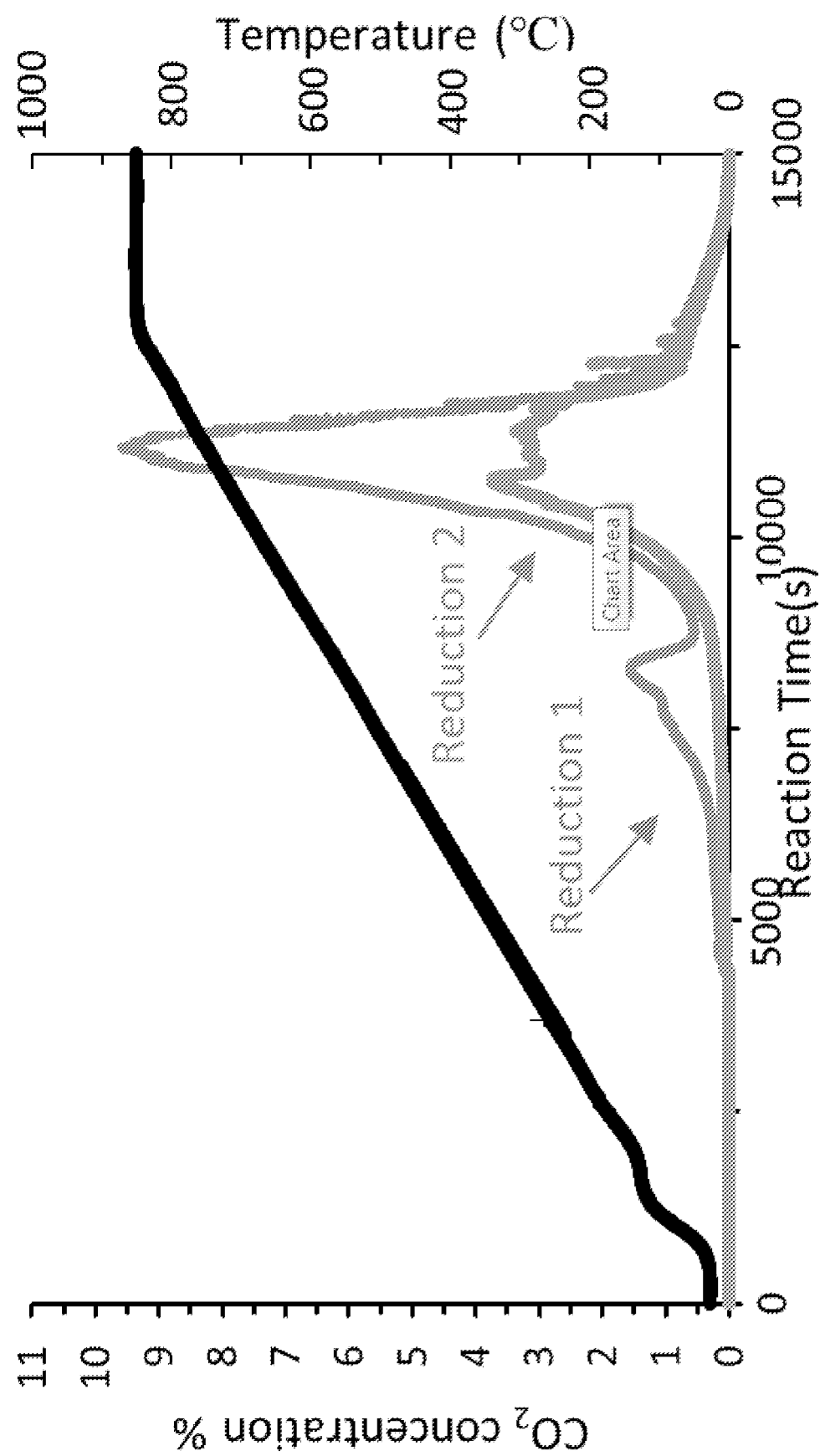
FIG. 3C depicts a graph illustrating the concentration of $CO_2$ during temperature programmed reaction (TPR) of $CuO$—$Fe_2O_3$-$Al_2O_3$ with 30% steam/coal: Reduction 1: 20 g Wyodak coal/$CuO$—$Fe_2O_3$—$Al_2O_3$, Reduction 2: 10 g coal/reduced $CuO$—$Fe_2O_3$—$Al_2O_3$.
Figure 3D:
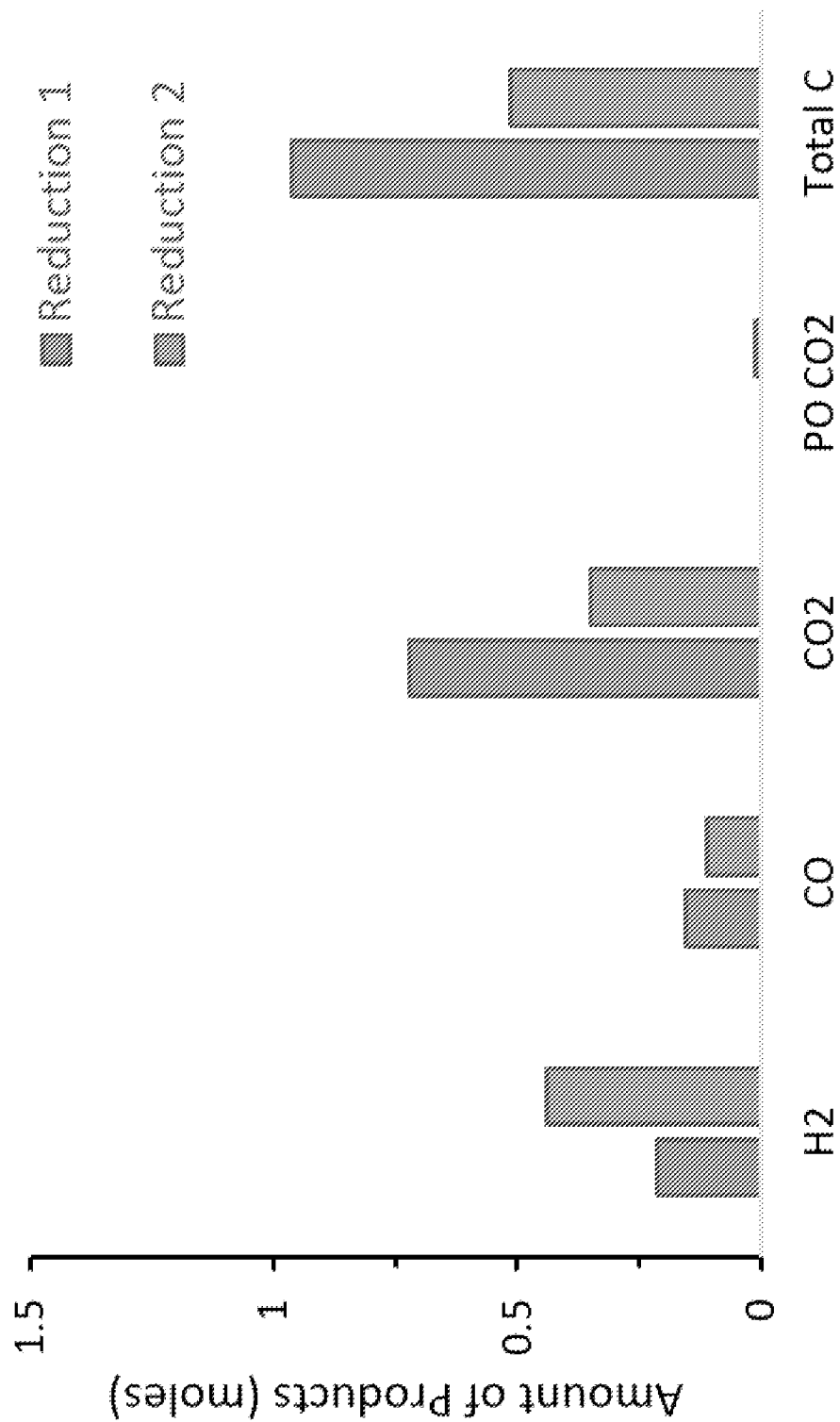
FIG. 3D depicts a graph illustrating the moles of gases produced during temperature programmed reaction (TPR) of $CuO$—$Fe_2O_3$-$Al_2O_3$ with 30% steam/coal: Reduction 1: 20 g Wyodak coal/$CuO$—$Fe_2O_3$—$Al_2O_3$, Reduction 2: 10 g coal/reduced $CuO$—$Fe_2O_3$—$Al_2O_3$.
Figure 4A:
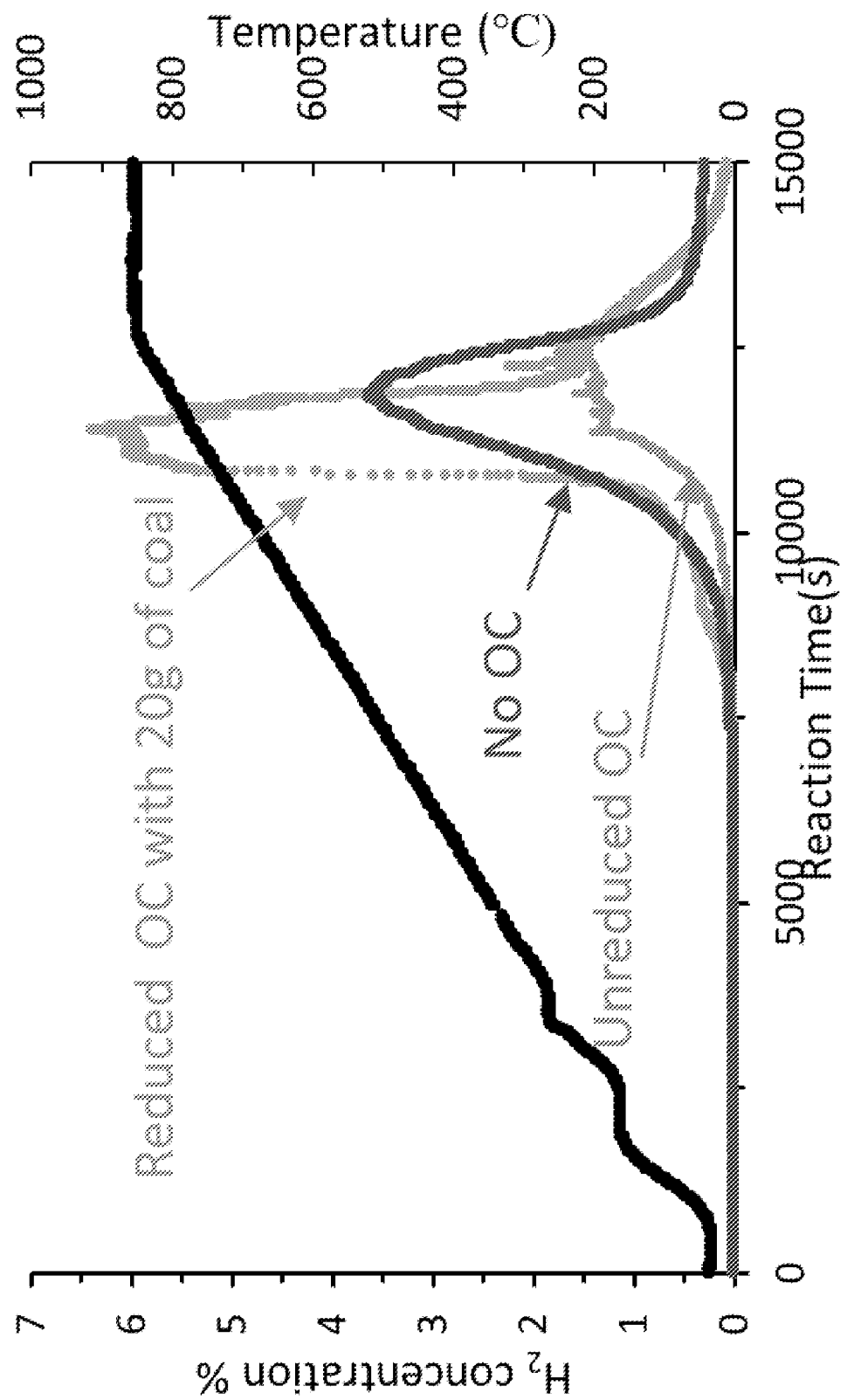
FIG. 4A depicts a graph illustrating the concentration of $H_2$ during reactions of 10 g coal/30% steam with (1) reduced $CuO$—$Fe_2O_3$—$Al_2O_3$(OC), (2) unreduced $CuO$—$Fe_2O_3$—$Al_2O_3$ (OC) and (3) no $CuO$—$Fe_2O_3$—$Al_2O_3$ (OC)
Figure 4B:
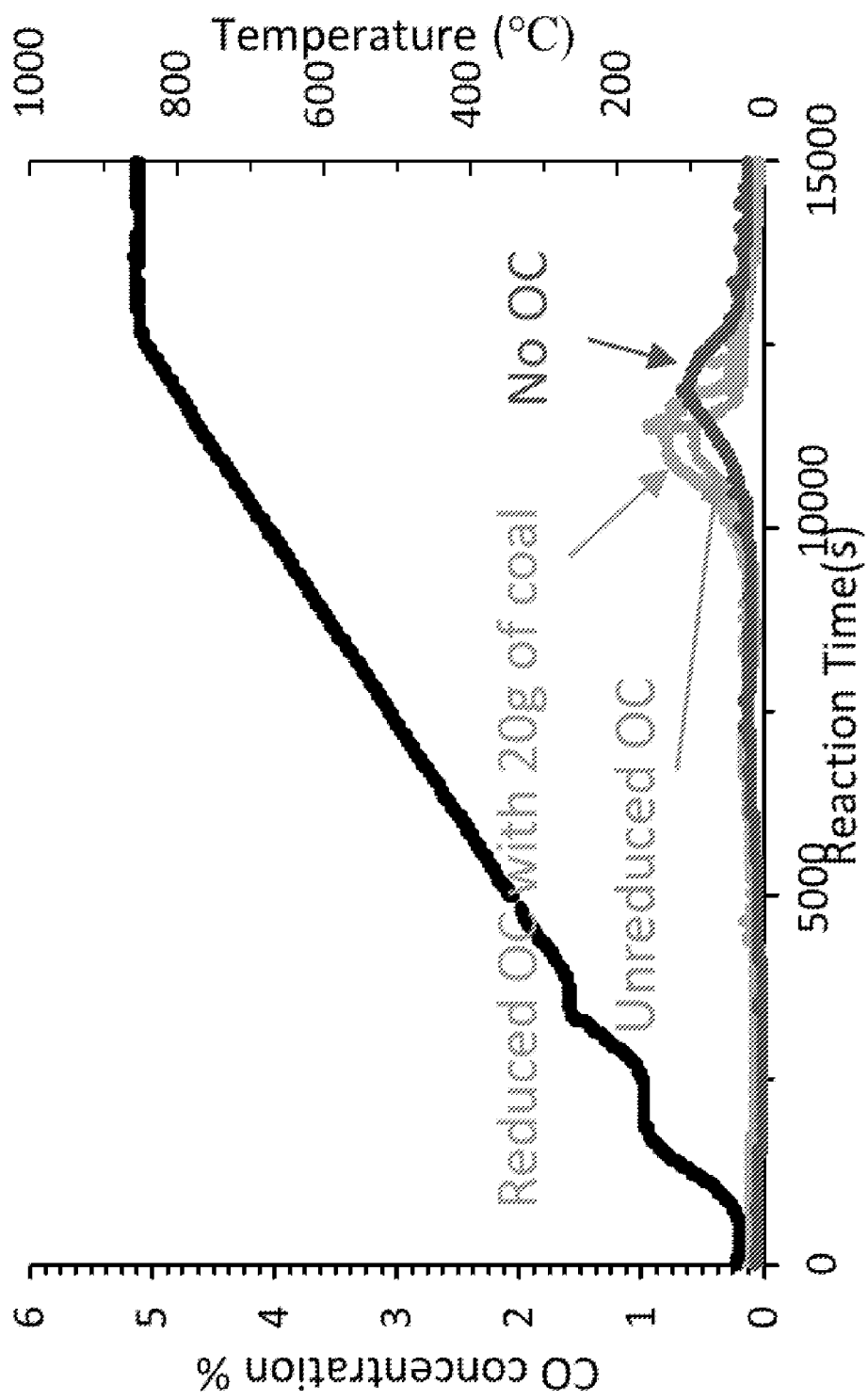
FIG. 4B depicts a graph illustrating the concentration of CO during reactions of 10 g coal/30% steam with (1) reduced $CuO$—$Fe_2O_3$—$Al_2O_3$(OC), (2) unreduced $CuO$—$Fe_2O_3$—$Al_2O_3$ (OC) and (3) no $CuO$—$Fe_2O_3$—$Al_2O_3$ (OC)
Figure 4C:
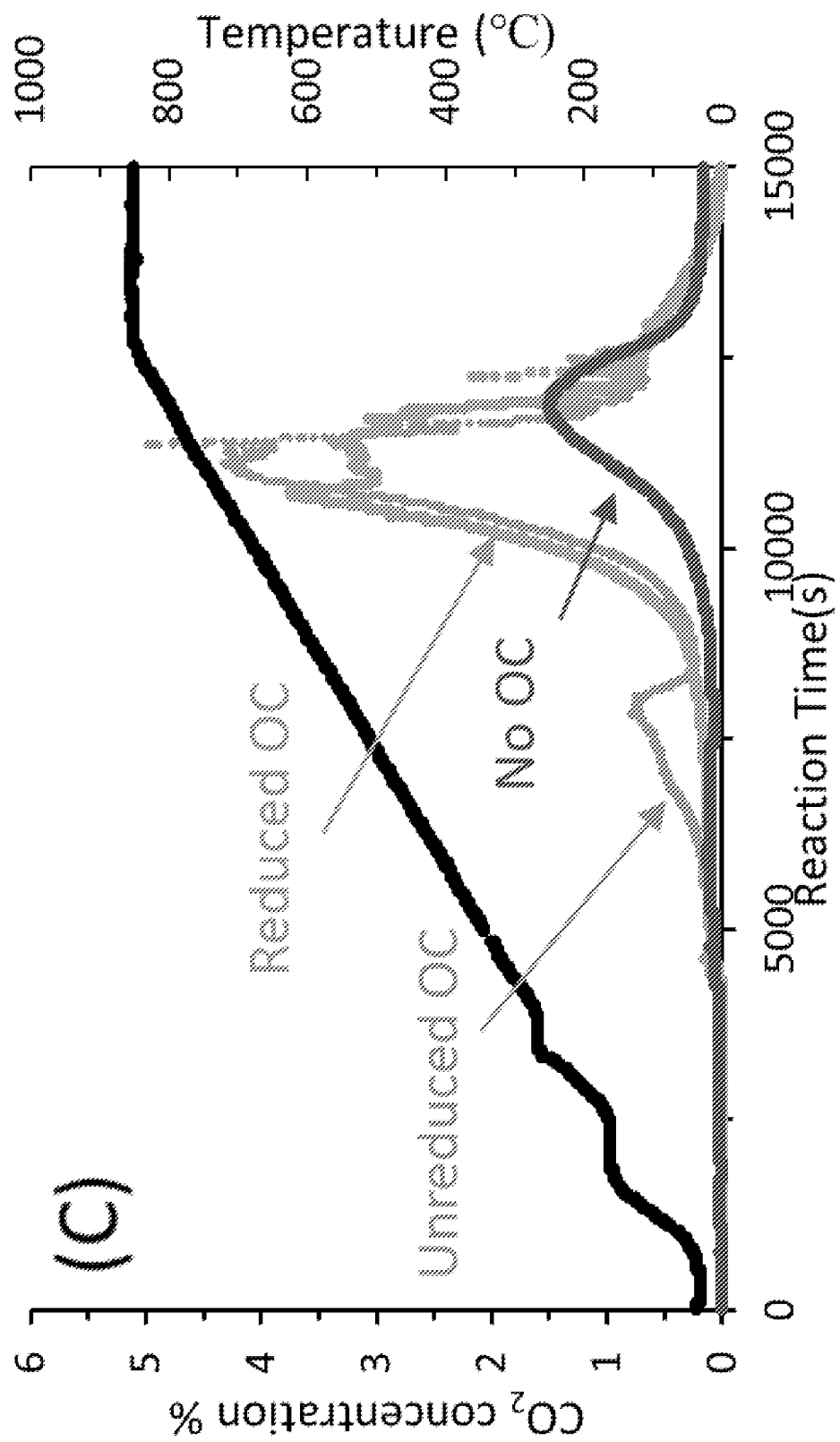
FIG. 4C depicts a graph illustrating the concentration of $CO_2$ during reactions of 10 g coal/30% steam with (1) reduced $CuO$—$Fe_2O_3$—$Al_2O_3$ (OC), (2) unreduced $CuO$—$Fe_2O_3$—$Al_2O_3$ (OC) and (3) no $CuO$—$Fe_2O_3$—$Al_2O_3$ (OC)
Figure 4D:
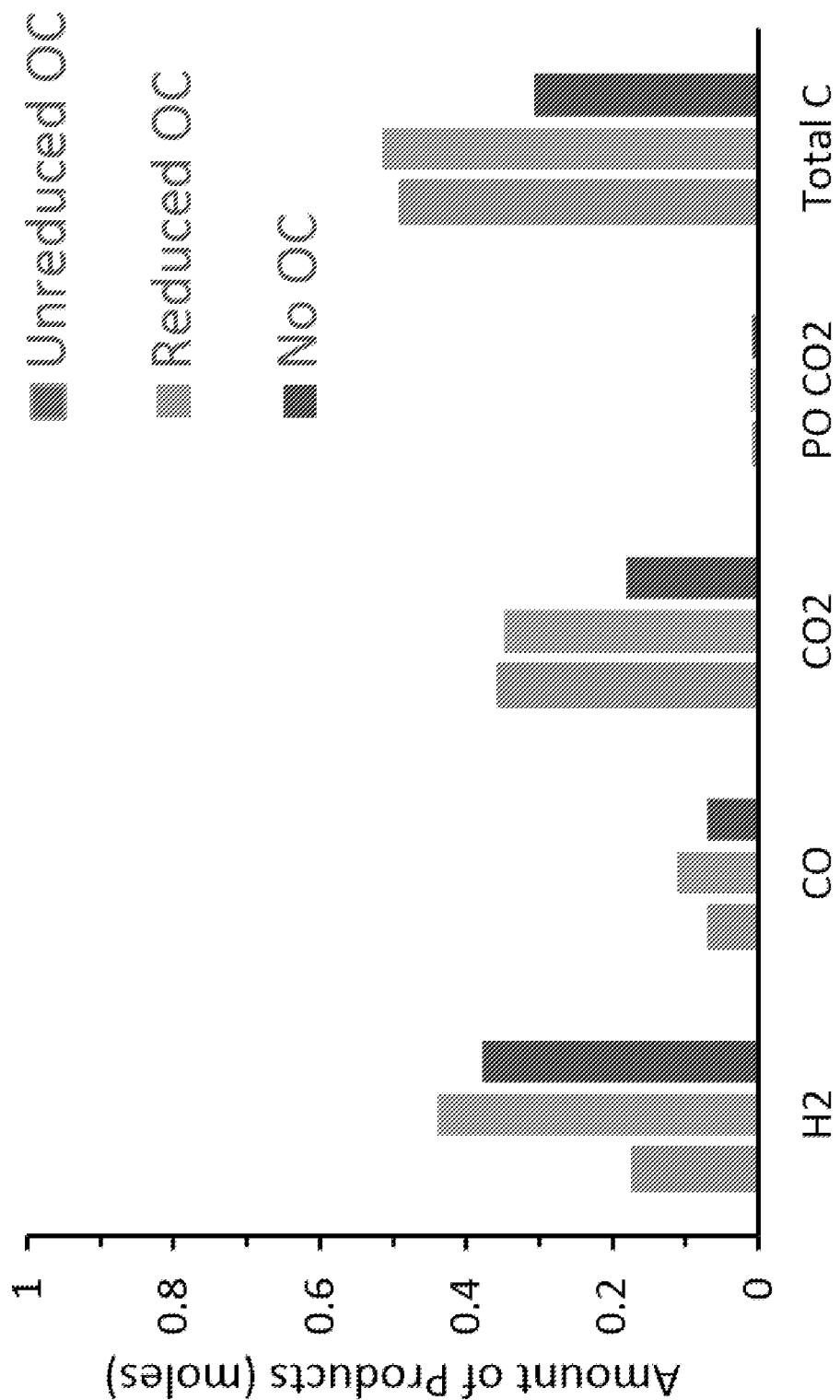
FIG. 4D depicts a graph illustrating the moles of gases produced during reactions of 10 g coal/30% steam with (1) reduced $CuO$—$Fe_2O_3$—$Al_2O_3$ (OC), (2) unreduced $CuO$—$Fe_2O_3$—$Al_2O_3$ (OC) and (3) no $CuO$—$Fe_2O_3$—$Al_2O_3$ (OC)
Figure 5A:
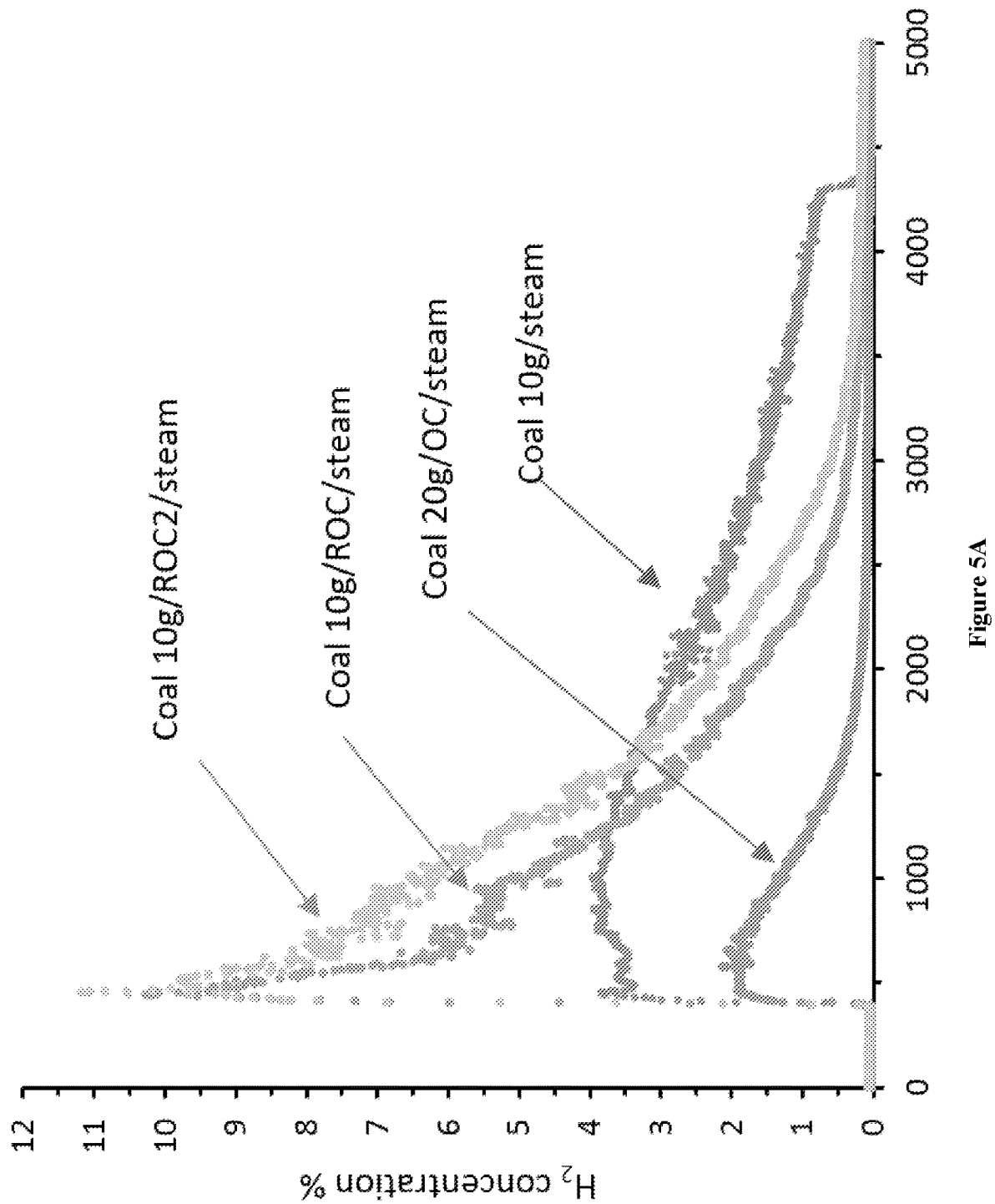
FIG. 5A depicts a graph illustrating the concentration of $H_2$ during TPR cyclic addition of Wyodak coal/15% steam at 850° C. to $CuO$—$Fe_2O_3$-alumina (OC) and reduced $CuO$—$Fe_2O_3$—$Al_2O_3$ (ROC)
Figure 5B:
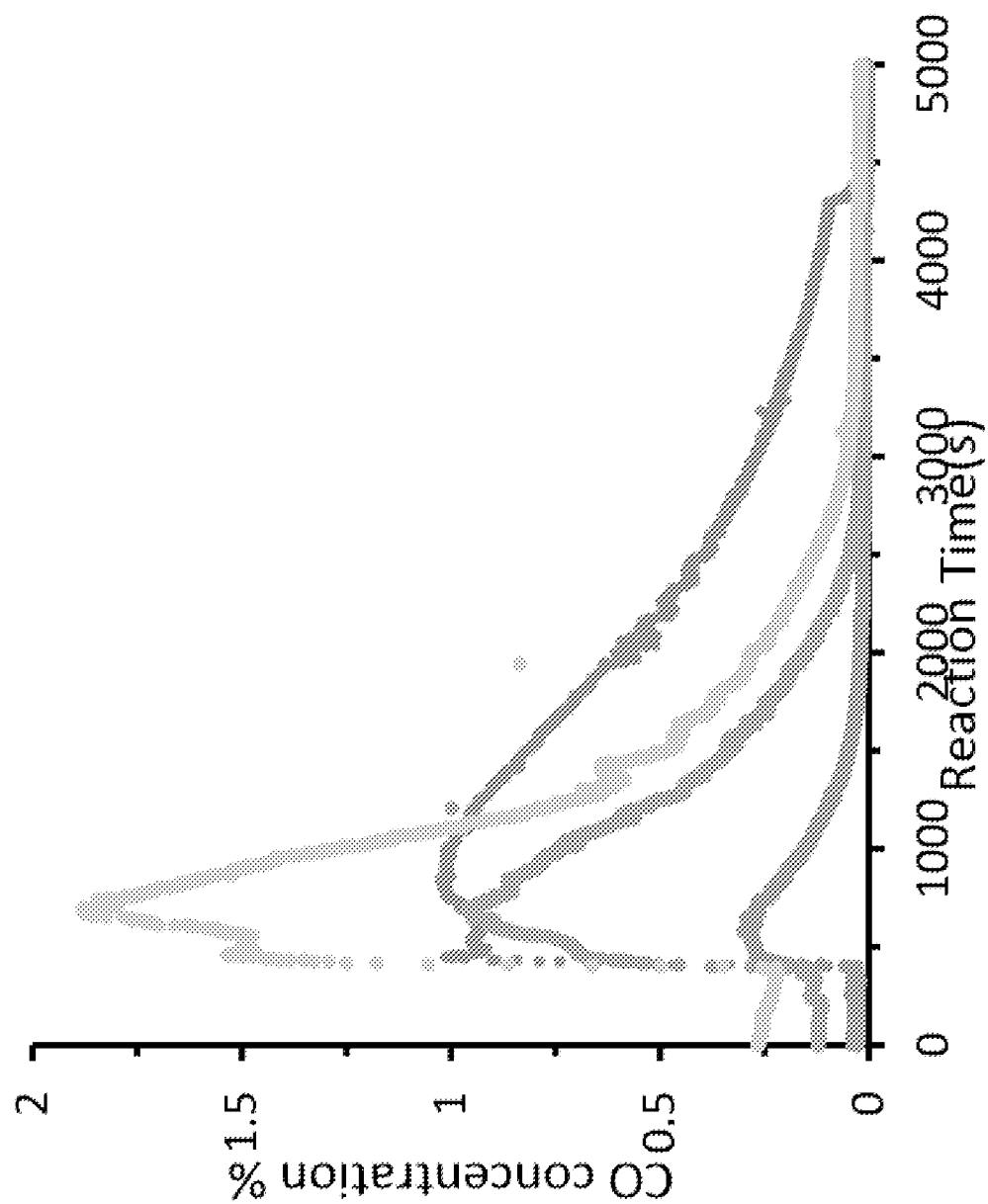
FIG. 5B depicts a graph illustrating the concentration of CO during TPR cyclic addition of Wyodak coal/15% steam at 850° C. to $CuO$—$Fe_2O_3$-alumina (OC) and reduced no $CuO$—$Fe_2O_3$—$Al_2O_3$ (ROC)
Figure 5C:
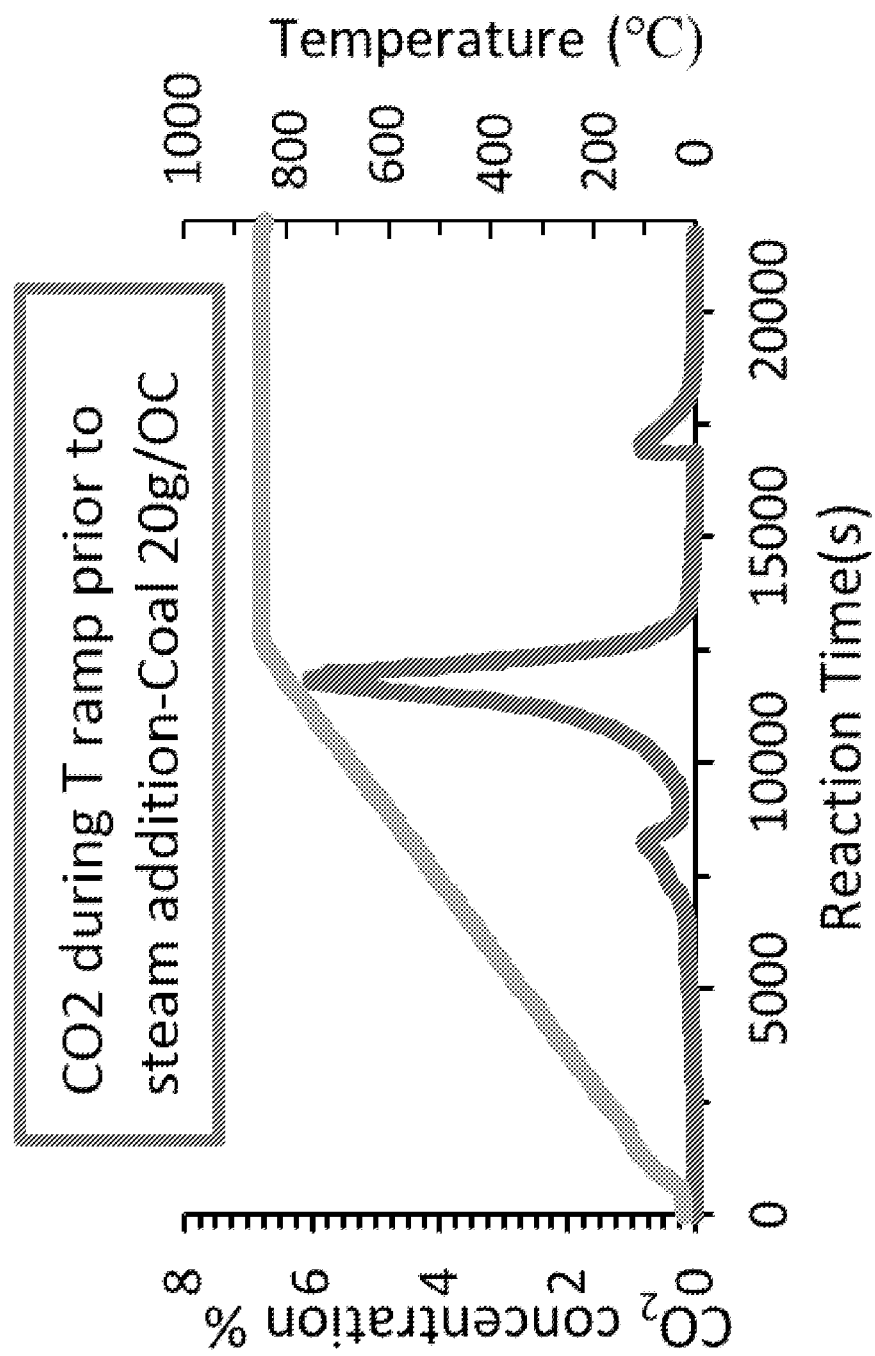
FIG. 5C depicts a graph illustrating the concentration of $CO_2$ during the temperature ramp to 850° C. of Wyodak coal/$CuO$—$Fe_2O_3$-alumina (OC)
Figure 5D:
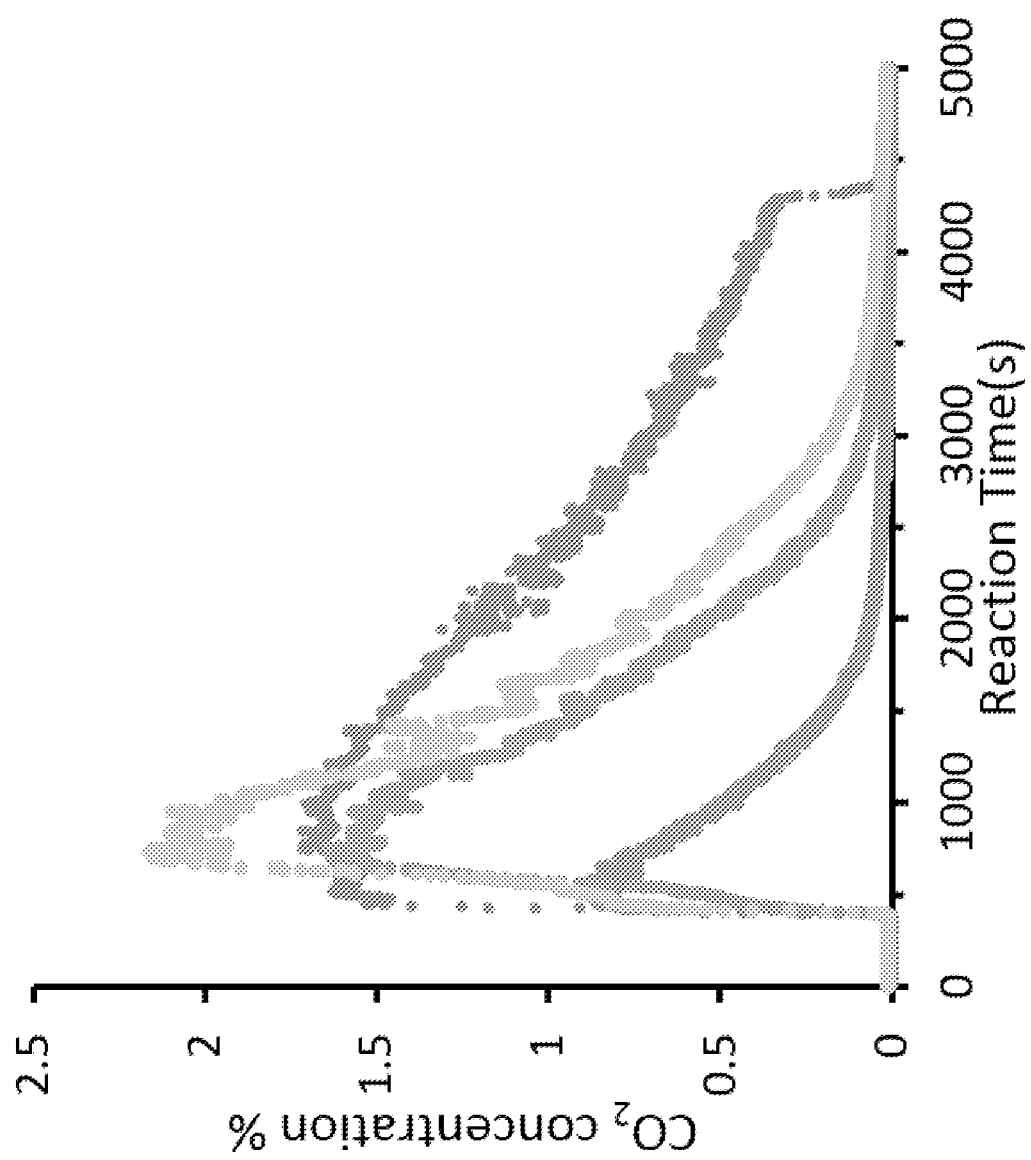
FIG. 5D depicts a graph illustrating the concentration of $CO_2$ during TPR cyclic addition of Wyodak coal/15% steam at 850° C. to $CuO$—$Fe_2O_3$-alumina (OC) and reduced no $CuO$—$Fe_2O_3$—$Al_2O_3$ (ROC)
Figure 6A:
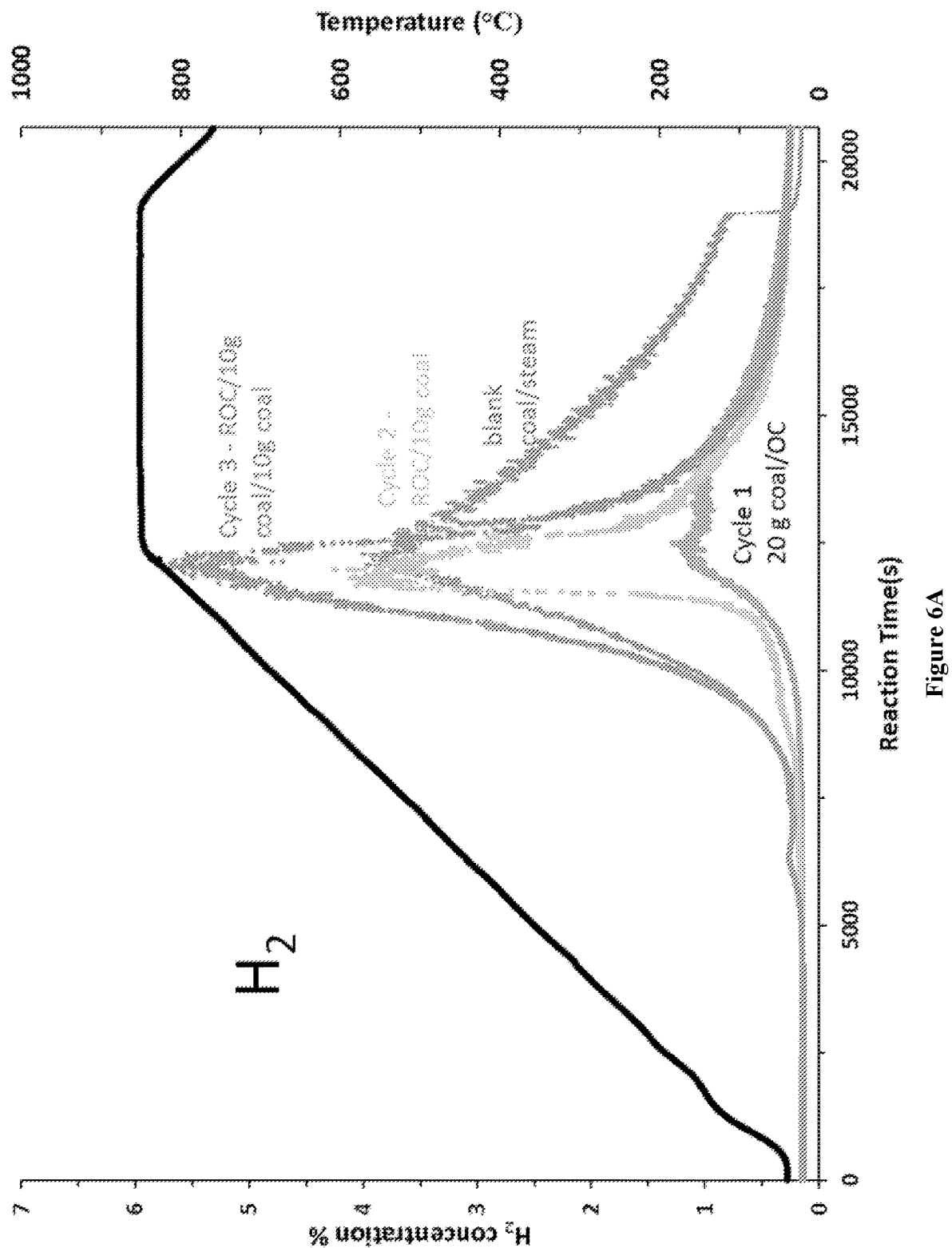
FIG. 6A depicts a graph illustrating the concentration of $H_2$ during TPR cyclic addition of Rosebud coal/15% steam at 300-850° C. to $CuO$—$Fe_2O_3$-alumina (OC) and reduced $CuO$—$Fe_2O_3$-alumina (ROC) (A) $H_2$ (B) $CO_2$ (C) CO during temperature ramp.
Figure 6B:
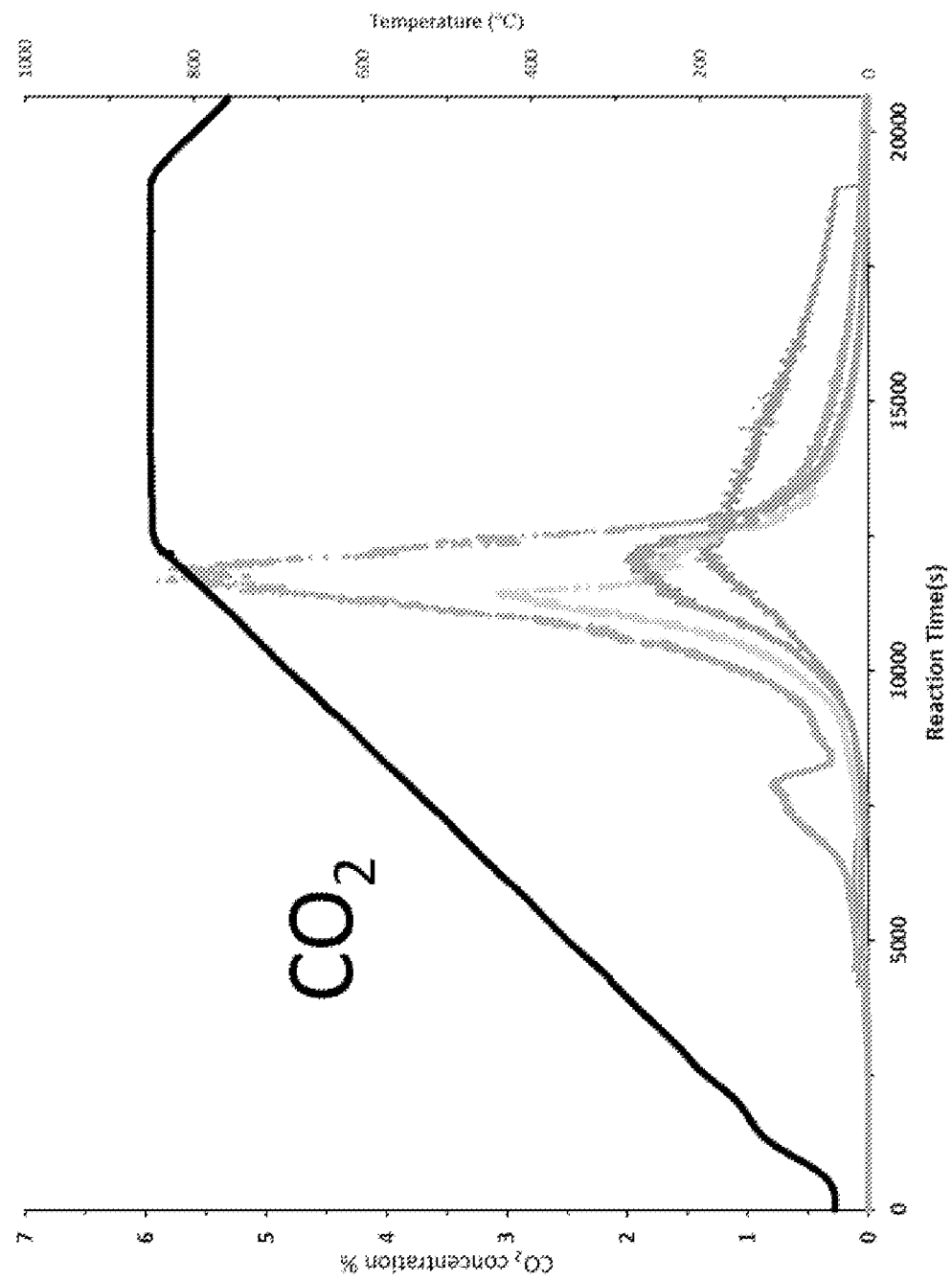
FIG. 6B depicts a graph illustrating the concentration of $CO_2$ during TPR cyclic addition of Rosebud coal/15% steam at 300-850° C. to $CuO$—$Fe_2O_3$-alumina (OC) and reduced $CuO$—$Fe_2O_3$-alumina (ROC) (A) $H_2$ (B) $CO_2$ (C) CO during temperature ramp.
Figure 6C:
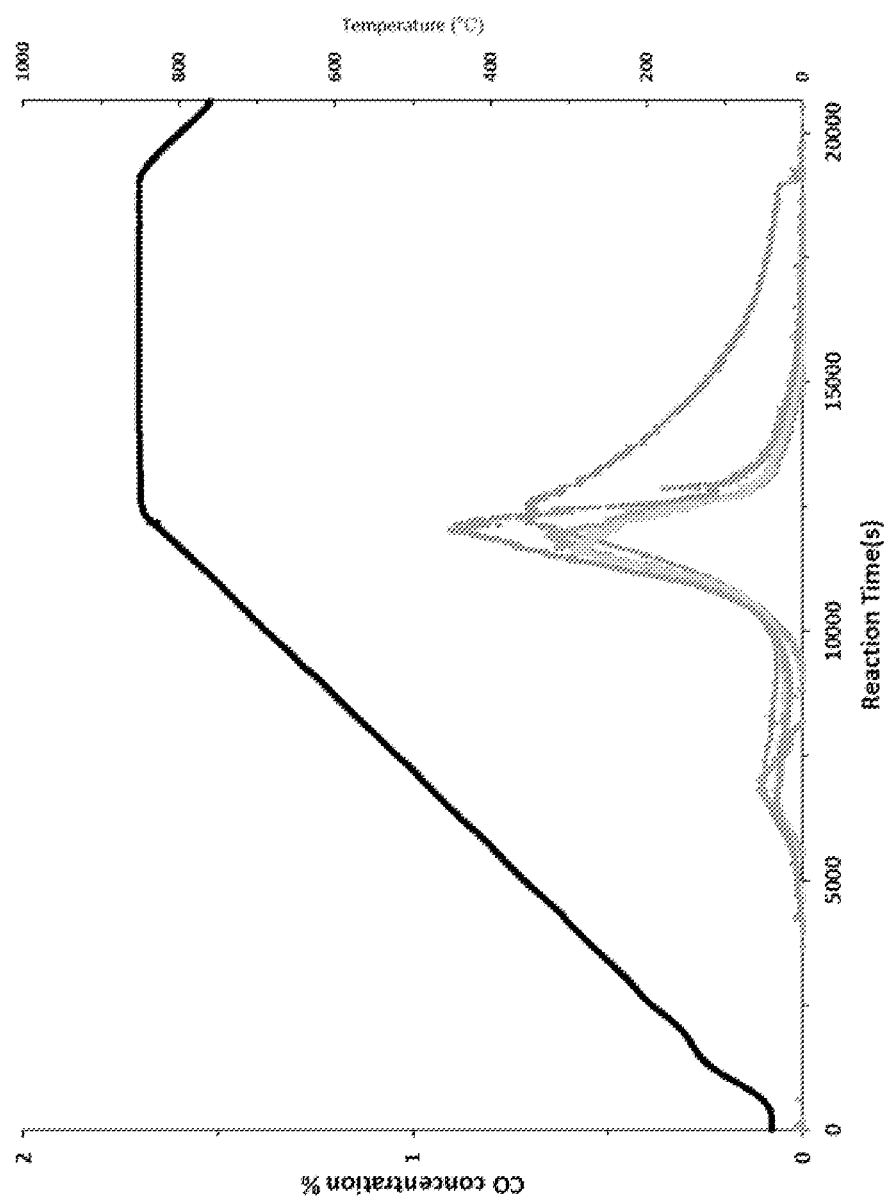
FIG. 6C depicts a graph illustrating the concentration of CO during TPR cyclic addition of Rosebud coal/15% steam at 300-850° C. to $CuO$—$Fe_2O_3$-alumina (OC) and reduced $CuO$—$Fe_2O_3$-alumina (ROC) (A) $H_2$ (B) $CO_2$ (C) CO during temperature ramp.
Figure 7A:
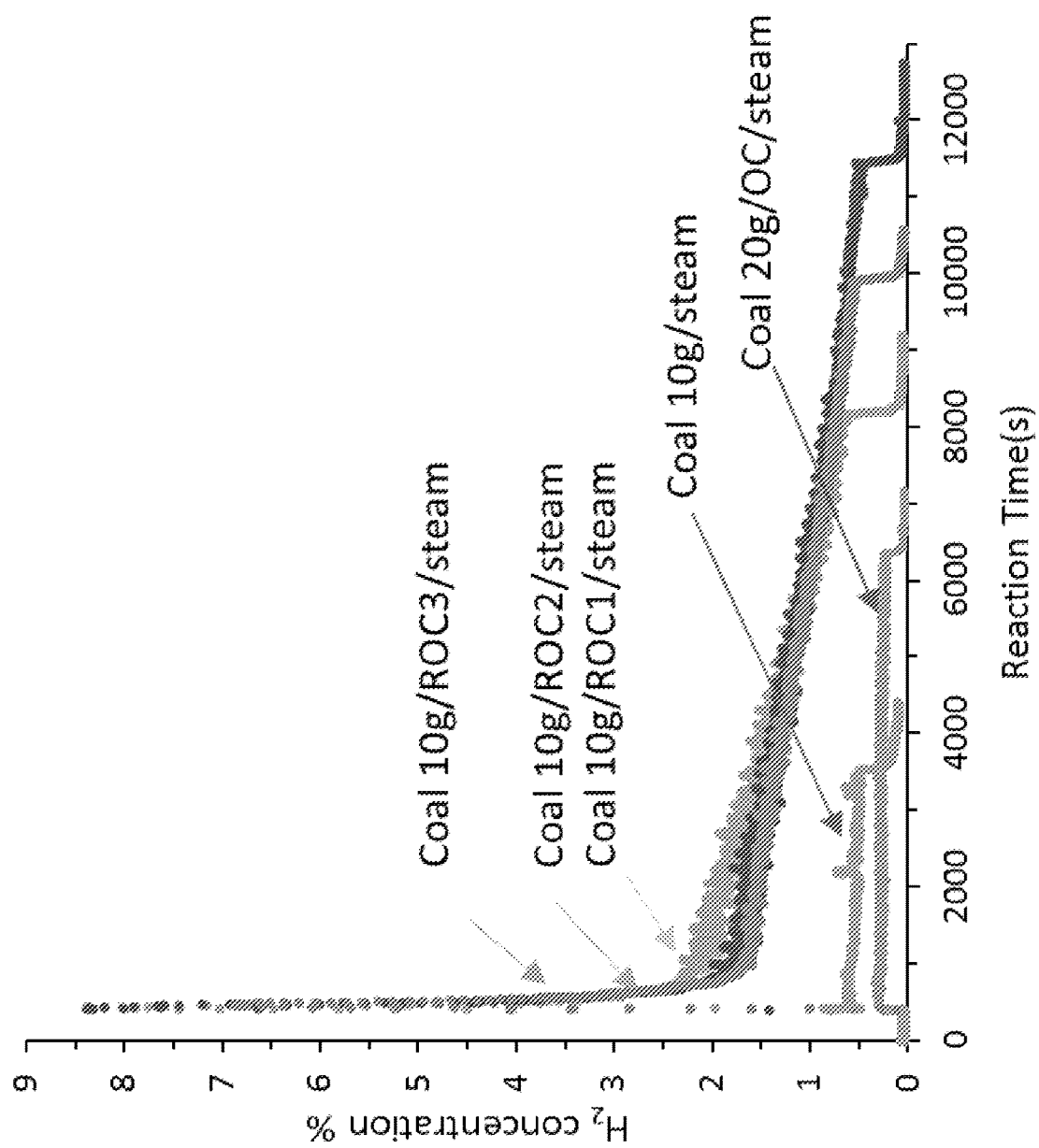
FIG. 7A depicts a graph illustrating the concentration of $H_2$ during TPR cyclic addition of Illinois #6 coal/15% steam at 850° C. to $CuO$-$Fe_2O_3$·alumina: step 1: 20 g coal with $CuO$—$Fe_2O_3$·alumina (OC), step 2-3: 10 g coal with already reduced $CuO$—$Fe_2O_3$·alumina (ROC) from the previous step.
Figure 7B:
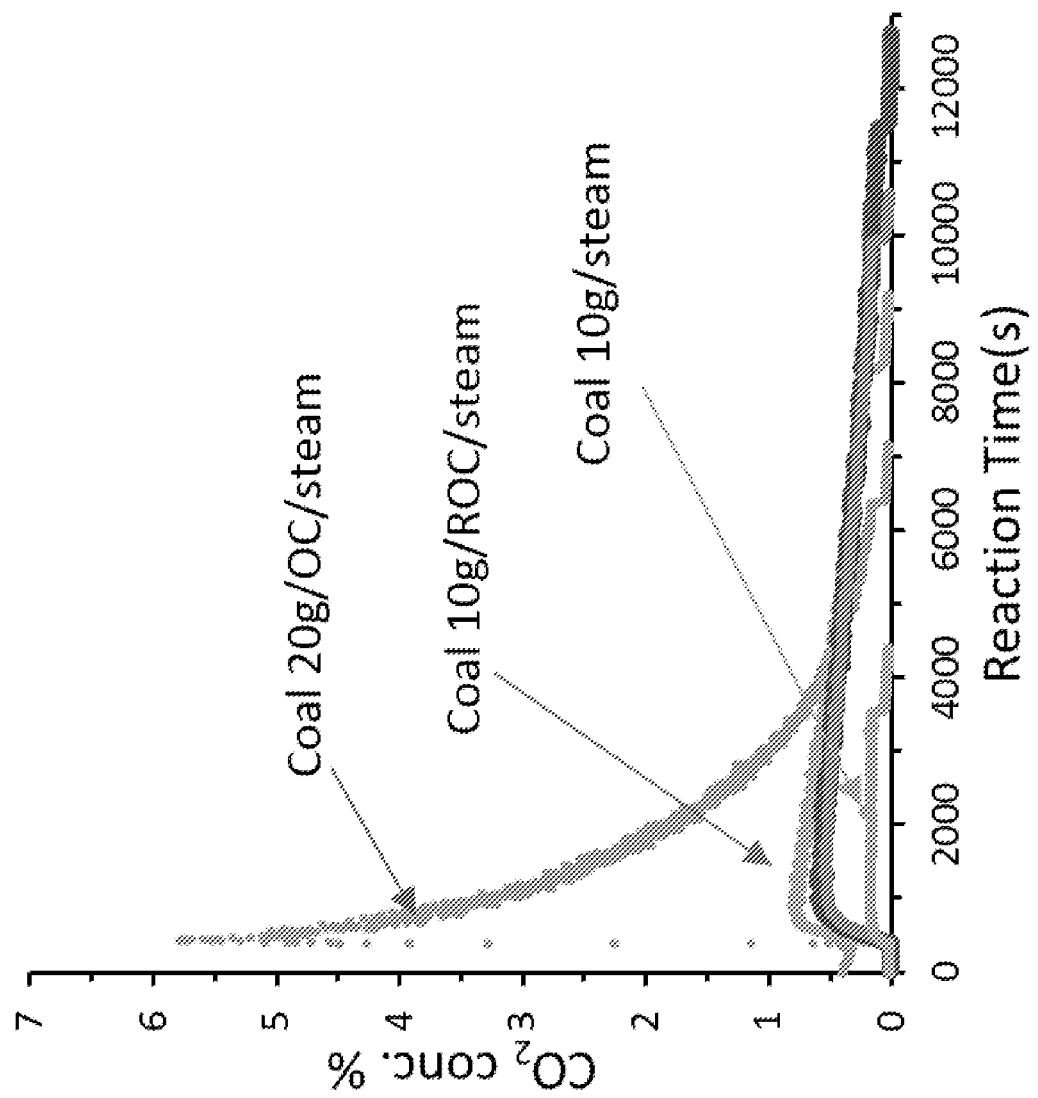
FIG. 7B depicts a graph illustrating the concentration of $CO_2$ during TPR cyclic addition of Illinois #6 coal/15% steam at 850° C. to $CuO$—$Fe_2O_3$ alumina: step 1: 20 g coal with $CuO$—$Fe_2O_3$·alumina (OC), steps 2-3: 10 g coal with already reduced $CuO$—$Fe_2O_3$·alumina (ROC)
Figure 7C:
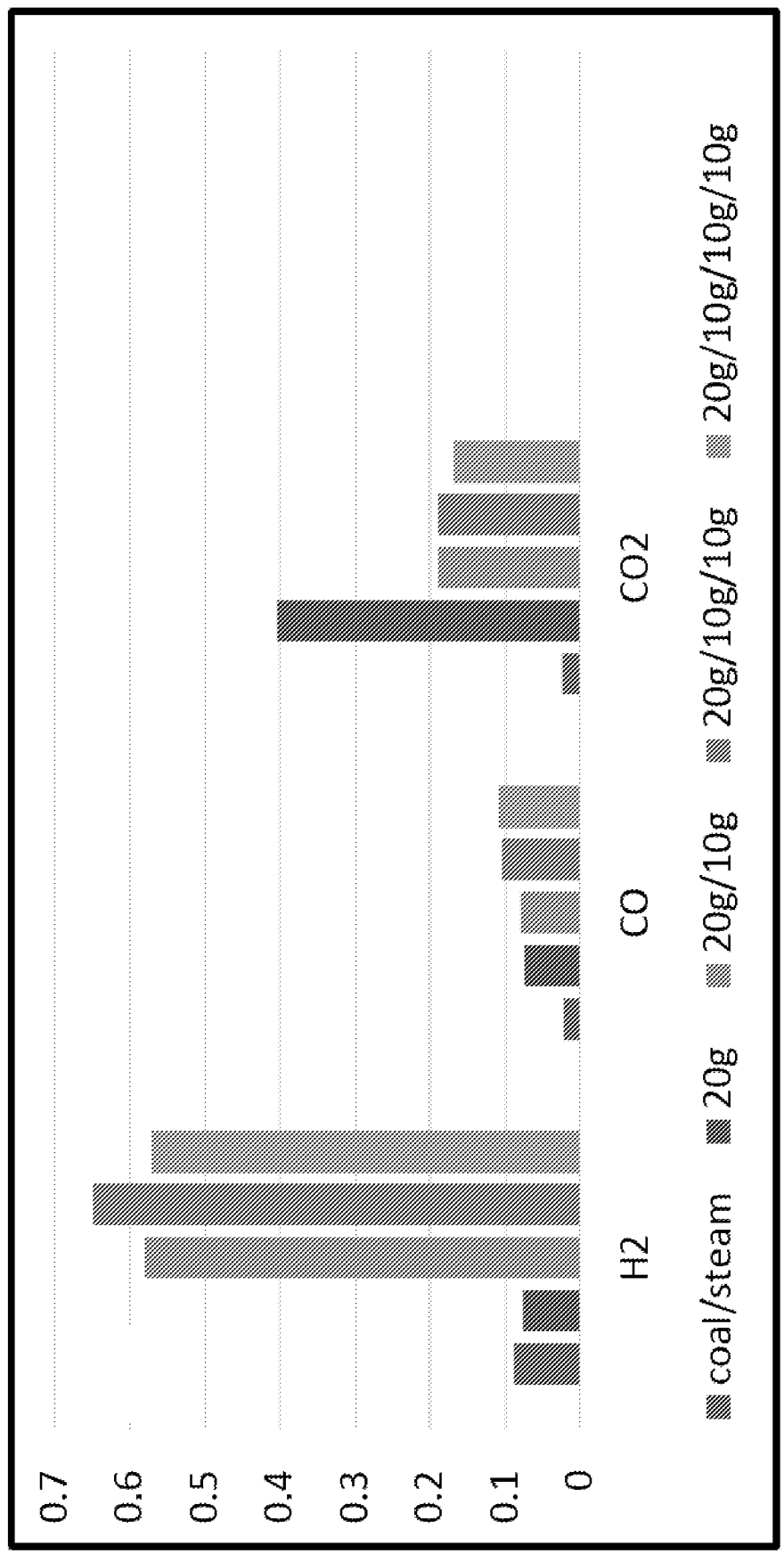
FIG. 7C depicts the graph illustrating the moles of gases produced during TPR cyclic addition of Illinois #6 coal/15% steam at 850° C. to $CuO$—$Fe_2O_3$·alumina: step 1: 20 g coal with $CuO$—$Fe_2O_3$·alumina (OC), steps 2-3: 10 g coal with already reduced $CuO$—$Fe_2O_3$·alumina (ROC)
Figure 8A:
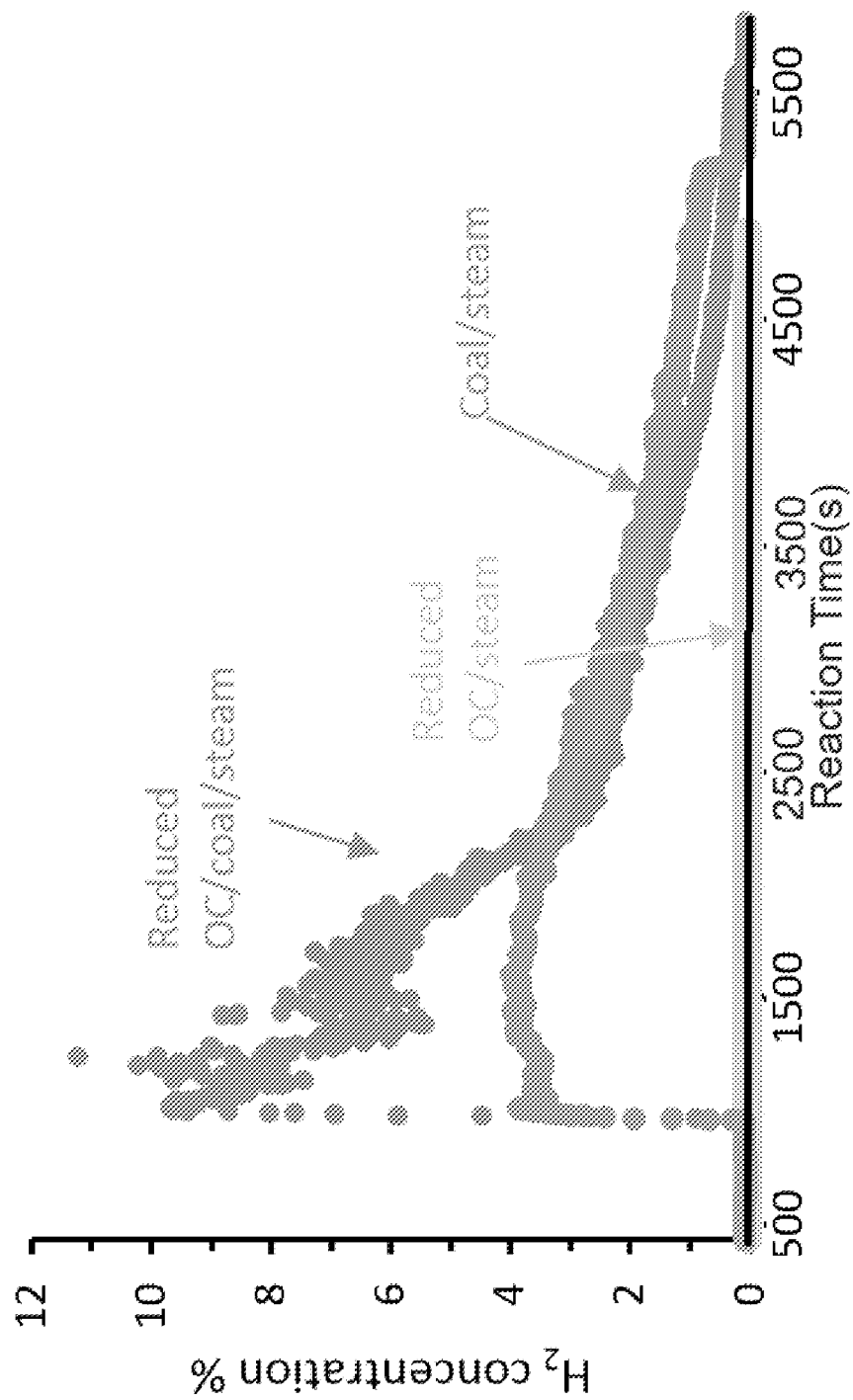
FIG. 8A depicts a graph illustrating the concentration of $H_2$ during the reaction of 15% steam at 850° C. with Wyodak coal/steam/fully reduced $CuO$—$Fe_2O_3$·alumina (OC) using $H_2$ as fuel, Wyodak coal/steam without coal/steam/fully reduced $CuO$—$Fe_2O_3$·alumina OC with $H_2$.
Figure 8B:
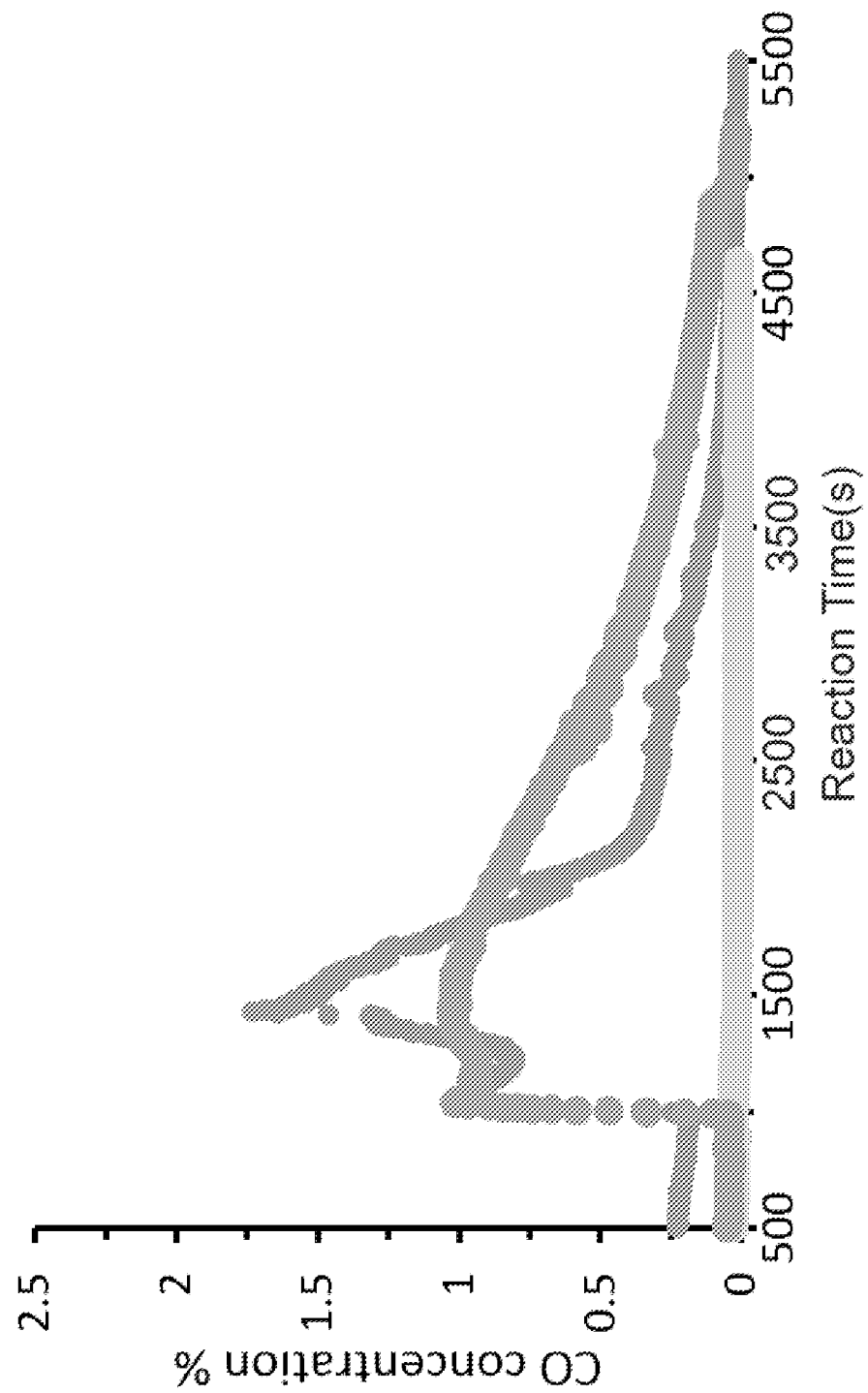
FIG. 8B depicts a graph illustrating the concentration of CO during the reaction of 15% steam at 850° C. with Wyodak coal/steam/fully reduced $CuO$—$Fe_2O_3$·alumina (OC) using $H_2$ as fuel, Wyodak coal/steam and steam without coal/fully reduced $CuO$—$Fe_2O_3$·alumina OC with $H_2$.
Figure 8C:
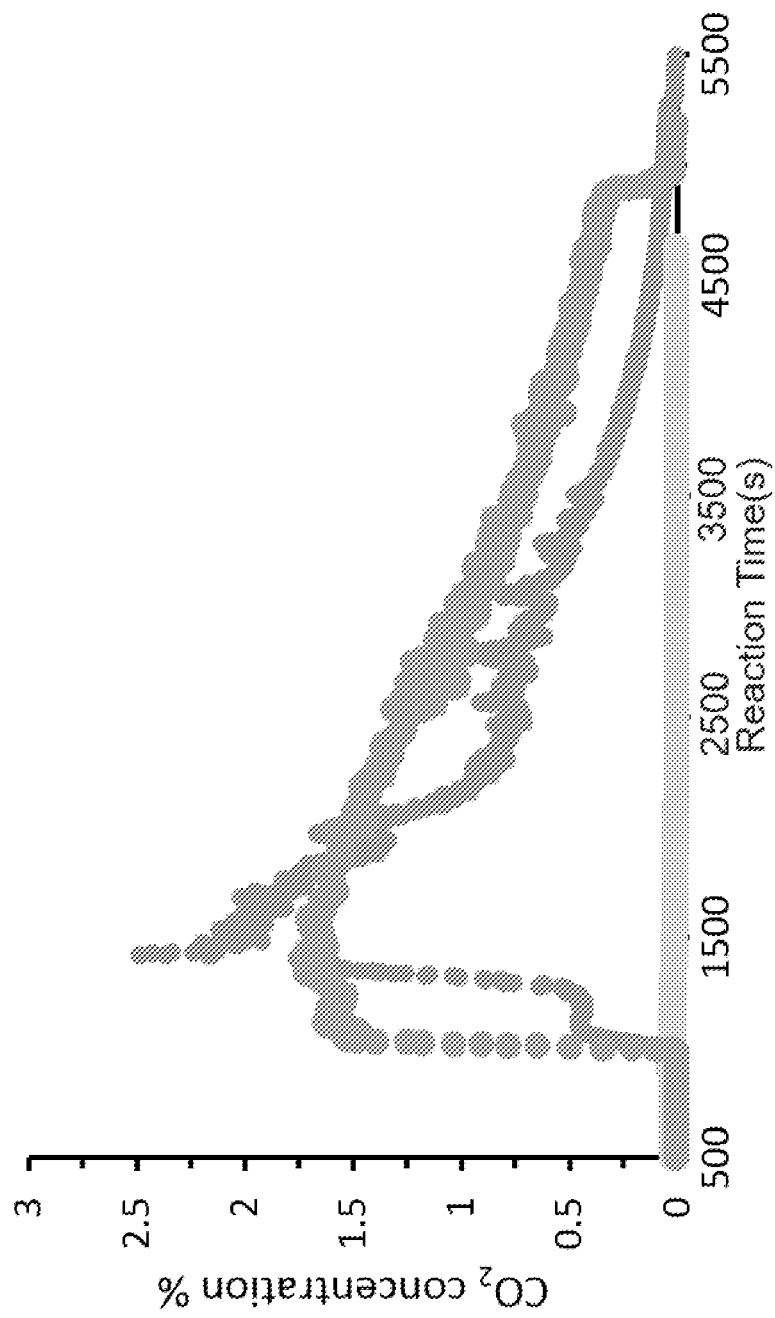
FIG. 8C depicts a graph illustrating the concentration of $CO_2$ during the reaction of 15% steam at 850° C. with Wyodak coal/steam/fully reduced $CuO$—$Fe_2O_3$·alumina (OC) using $H_2$ as fuel, Wyodak coal/steam and steam without coal/fully reduced $CuO$—$Fe_2O_3$·alumina OC with $H_2$.
Figure 8D:
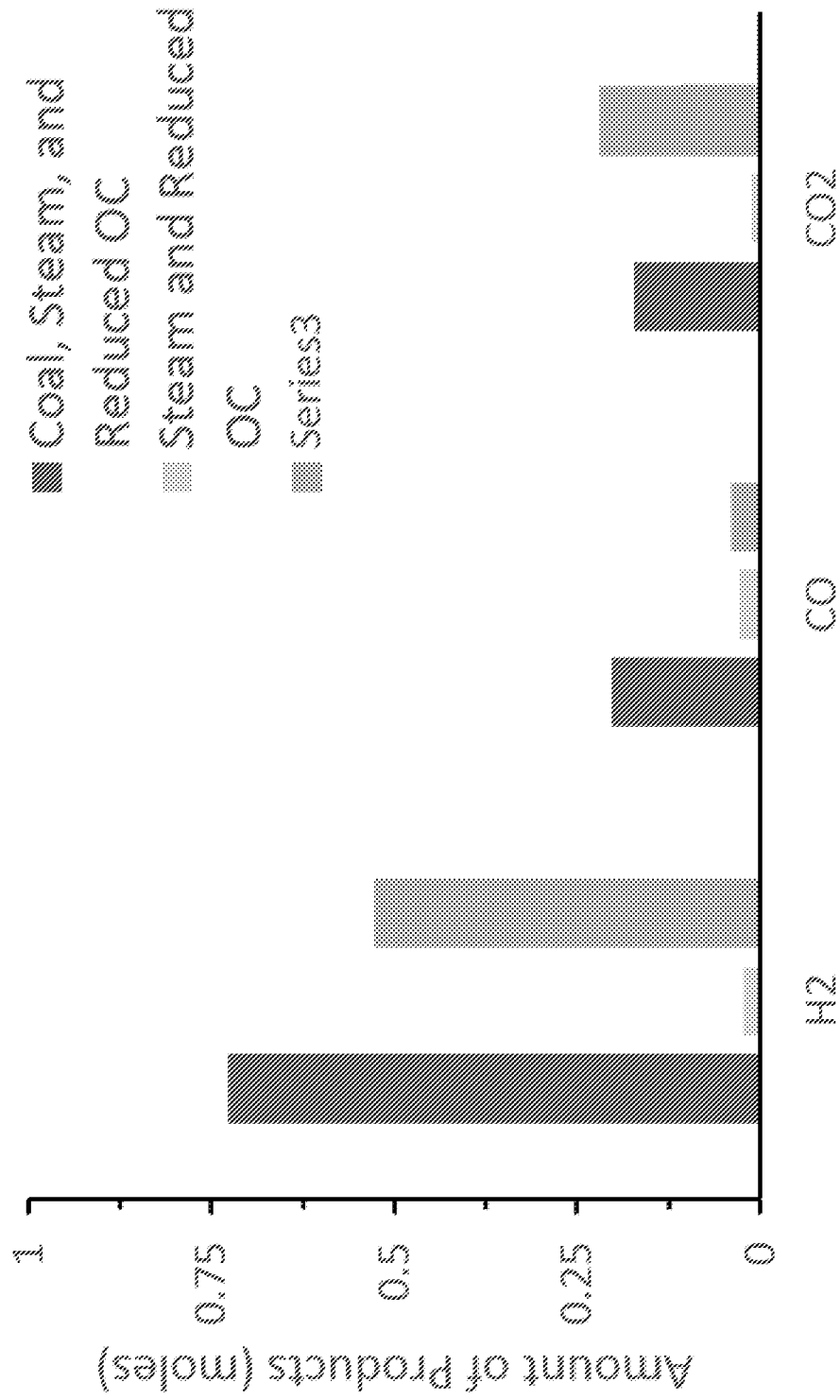
FIG. 8D depicts a graph illustrating the moles of gases produced during the reaction of 15% steam at 850° C. with Wyodak coal/steam/fully reduced $CuO$—$Fe_2O_3$·alumina (OC) using $H_2$ as fuel, Wyodak coal/steam and steam without coal/fully reduced $CuO$—$Fe_2O_3$·alumina OC with $H_2$.

Fluidized bed reactor test data of $CuO$—$Fe_2O_3$-Alumina oxygen carrier (MO) with Wyodak coal/steam to produce $H_2$ rich syngas during temperature ramp from ambient to 850° C. with 30% steam addition at 300° C. are illustrated in FIGS. 3A-3D. When 20 g of coal was mixed with 322 g of oxygen carrier and heated from ambient to 850° C. with 30% steam added at 300° C. in the fluidized bed reactor, the major peak was $CO_2$ while $H_2$ and CO peaks were low as shown in reduction step 1 in FIG. 3A-3D which indicated that the coal combustion reaction took place in the reduction step I while $CuO$—$Fe_2O_3$-Alumina got reduced. In reduction step 2, when 10 g of coal was added to the reduced oxygen carrier from reduction step 1 and a similar temperature ramp was performed with 30% steam, the major peak was $H_2$ with some $CO_2$ and minimal amount of CO. When oxidation with air was performed after step 2, the amount of $CO_2$ formed was very low as shown in FIG. 3D (PO $CO_2$) indicating that all the coal was consumed during reduction steps 1 and 2.

Comparative plots of data during similar temperature ramps with 10 g of Wyodak coal/30% steam without an oxygen carrier and 10 g Wyodak coal/unreduced oxygen carrier/30% steam are shown in FIG. 4A-4D. As shown in FIG. 4A-4D, the rate of $H_2$ production rate was highest with the oxygen carrier reduced using 20 g of coal/10 g of coal/steam. It should be noted that $H_2$ production rate and the $CO_2$ production rate with the reduced oxygen carrier was higher than that with coal gasification with steam as also shown in FIG. 4A-4D. The experiments were done in the fluidized bed reactor in which the reduced oxygen carrier and coal had minimal contacts. Therefore, the traditional catalytic gasification reported in the literature in which the coal is impregnated with metal salt solutions may not explain the selective improvement of $H_2$ production with the coal/steam/reduced oxygen carrier. The oxygen for $CO_2$ formation has to come from the steam introduced to the gas stream since the oxygen depleted reduced metal oxide may not supply oxygen for the reaction.

Tests were conducted to understand whether the process of $H_2$ production is continuous with the reduced oxygen carrier when the coal addition was continued after the initial reduction. In this test series, 15% steam was added at 850° C. after the temperature ramp with coal/oxygen carrier. The results are shown in FIG. 5A-5D. The cycle 1 TPR was conducted with $CuO—Fe_2O_3$-Alumina oxygen carrier and 20 g of coal with steam at 850° C. and the data indicated that the coal combustion took place during the temperature ramp from oxygen released from the oxygen carrier as well as from the steam/coal at 850° C. as evidenced by the $CO_2$ production during both the ramp and in the isothermal section. After this initial reduction, the reduced oxygen carrier was cooled to ambient and additional 10 g of coal was added for the temperature ramp during each subsequent cycle with steam addition at 850° C. As shown in FIG. 5A-5D, the production of $H_2$ continued in subsequent cycles. This indicated that the reduced oxygen carrier remained reduced without getting oxidized and continuous $H_2$ production may be obtained when coal was added continuously. The $H_2$ concentration peak maxima with the reduced oxygen carrier were significantly higher than that with coal/steam without the oxygen carrier as also shown in FIG. 5A-5D. There was also some increase in CO and $CO_2$ concentration peak maxima when reduced oxygen carrier was reacted with steam/coal.

TPR tests with Rosebud coal which is a sub bituminous coal was also conducted with $CuO—Fe_2O_3—Al_2O_3$ oxygen carrier in the fluidized bed reactor. TPR-cycle 1 was performed with 20 g of coal and the oxygen carrier, with 15% steam addition at 300-850° C. Then three cycles of TPR were conducted by cooling the oxygen carrier and adding 10 g coal in each cycle. Blank experiment was also conducted with coal/steam without the oxygen carrier. The concentrations and amounts of gases produced are shown in FIG. 6A-6D. Similar to the data with Wyodak coal, during the initial reduction of the oxygen carrier with 20 g of Rosebud coal, the major product gas was $CO_2$ due to combustion of coal. During subsequent cycles with 10 g of coal/reduced oxygen carrier, the major product gas was $H_2$. The $H_2$ concentration production rate at the third cycle was higher than that with the blank coal. The reaction behavior with Rosebud coal is very similar to that with Wyodak coal and both these coals are sub-bituminous coals.

TPR was also performed with Illinois #6 coal which is a high rank bituminous coal and $CuO—Fe_2O_3—Al_2O_3$ oxygen carrier in the fluidized bed reactor. Similar to the previous tests, TPR was performed with 20 g of coal in cycle 1 with 15% steam addition at 850° C. and TPR cycles were repeated with a new 10 g coal/steam sample for three more cycles. Blank experiment was also conducted with Illinois #6 coal/steam without the oxygen carrier. The concentrations and amounts of gases produced are shown in FIGS. 7A-7D. During the initial reduction of the fresh oxygen carrier with 20 g of Illinois #6 coal, the major product gas was $CO_2$ and during subsequent cycles with 10 g of coal/reduced oxygen carrier/steam at 850° C., the major product gas was $H_2$ with a very high concentration maximum indicating that the $H_2$ release was very rapid with the Illinois #6 coal. $H_2$ concentration maximum remained same during the next three cycles with addition of 10 g of coal/steam in each cycle which indicated that the reduced oxygen carrier remained in the reduced form during $H_2$ production with continuous addition of coal. The $H_2$ and $CO_2$ production rates as well as the amounts formed with the reduced oxygen carrier/coal/steam were significantly higher than that with coal/steam without the oxygen carrier. Both $H_2$ and CO were significantly low when Illinois #6 coal which is less reactive bituminous coal was gasified with 15% steam at 850° C. without the oxygen carrier. The data indicated that the effect on $H_2$ production rate with the reduced oxygen carrier was more significant with Illinois #6 coal than that with the Wyodak coal. This is important that the steam gasification of less reactive coals may also be achieved with the reduced oxygen carrier.

To understand the effect of extent of reduction on $H_2$ production with coal/steam, the $CuO—Fe_2O_3$-alumina oxygen carrier was fully reduced with 10% $H_2$ in He at 700° C. Then the reduced oxygen carrier was cooled to ambient temperature, 10 g of coal was added and temperature ramp was performed up to 850° C. with 15% steam addition at 850° C. The results are shown in FIG. 8A-8D. For comparison, two blank experiments were also conducted: first blank experiment using coal without the oxygen carrier and 15% steam at 850° C., and the second blank experiment with fully reduced oxygen carrier and 15% steam at 850° C. (no coal). As shown in FIG. 8A-8D, there was no $H_2$ formation with the fully reduced $CuO—Fe_2O_3$-Alumina oxygen carrier and steam indicating there was no $H_2$ production by the water splitting reaction at 850° C. So, the coal should be present with the reduced $CuO—Fe_2O_3$-Alumina to form $H_2$ with steam. The $H_2$ formation was also significantly higher with the fully reduced oxygen carrier/coal/steam than that with coal/steam indicating that the reduced carrier is promoting the $H_2$ formation X-ray diffraction studies (XRD) were conducted to identify the phases of $CuO—Fe_2O_3—$ Alumina oxygen carrier formed after the multi-cycle reactions with coal/steam. The XRD data of fresh and reacted with a metal aluminate catalyst such as $CuO—Fe_2O_3$-Alumina with both Wyodak and Illinois #6 coal is shown in Table 1. It should be noted that some Cu metal and Fe metal were detected with the reacted samples. The data indicated that metallic iron and copper remained after multi-cycle reaction with coal/steam.

TABLE 1

XRD data of fresh and reacted metal aluminate
catalyst such as CuO-Fe$_2$O$_3$-Alumina

| Phases | Fresh | Reacted with Wyodak coal/steam | Reacted with Illinois #6 coal/steam |
|---|---|---|---|
| Spinel (Cu aluminate) | 40 | 31 | 20 |
| Corundum (aluminum oxide) | 13 | 11 | 23 |
| Hercynite (iron aluminate) | 47 | 33 | 42 |
| Fe | — | 12 | 13 |
| Cu | — | 13 | 2 |

Figure 9A:
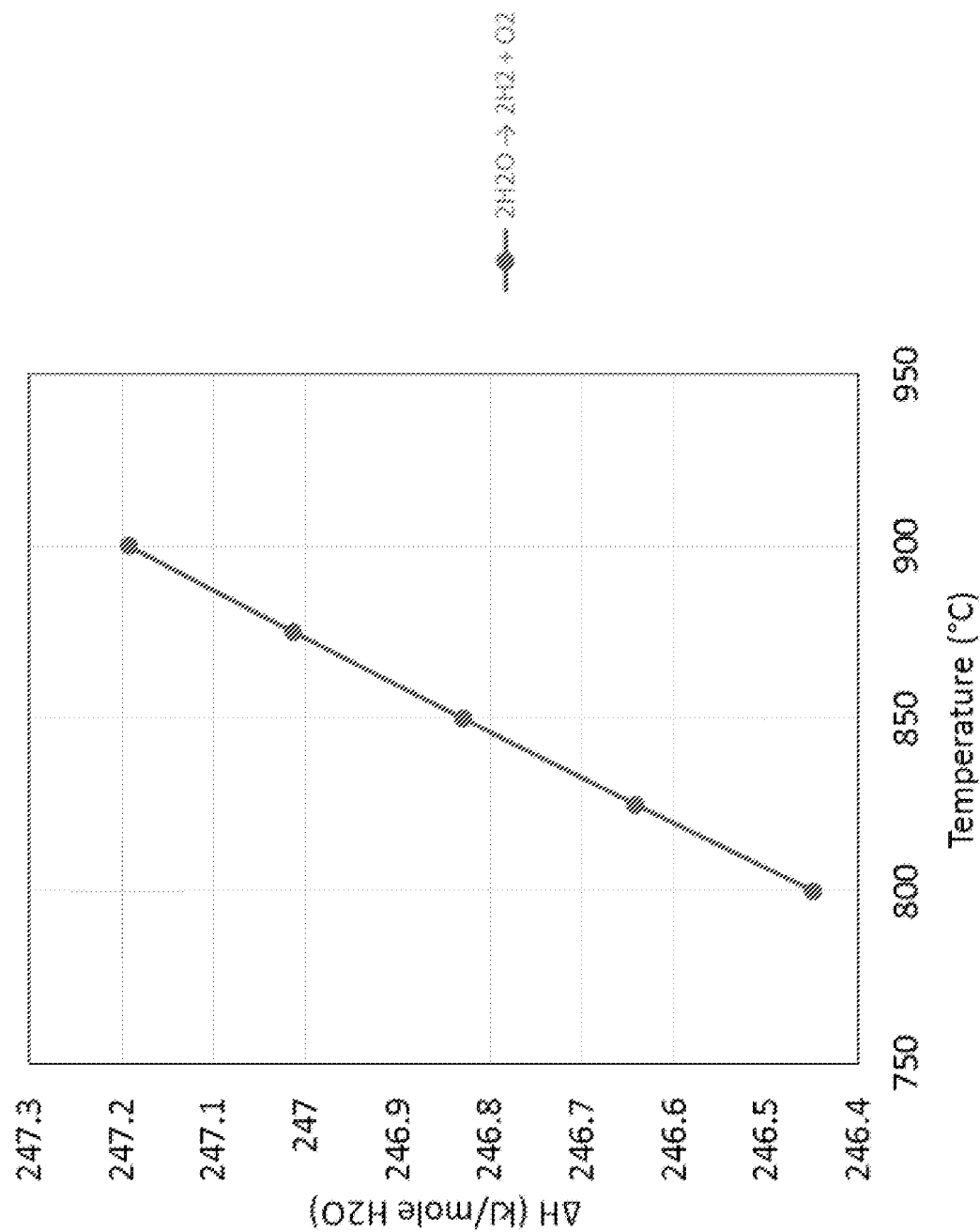
FIG. 9A depicts a graph illustrating heats of reactions for the water splitting reaction.
Figure 9B:
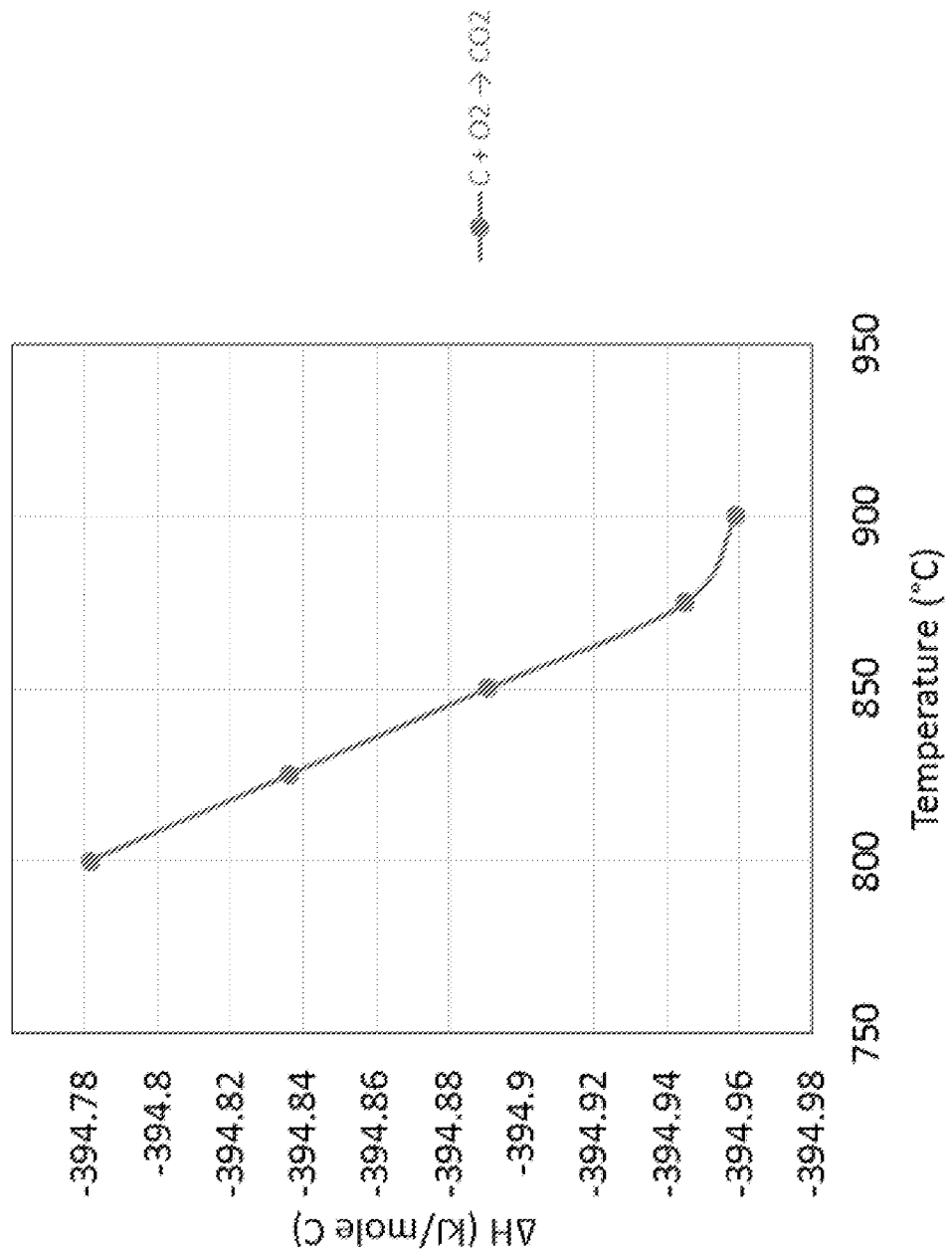
FIG. 9B depicts a graph illustrating heats of reactions for the carbon oxidation reaction to form $CO_2$.
Figure 9C:
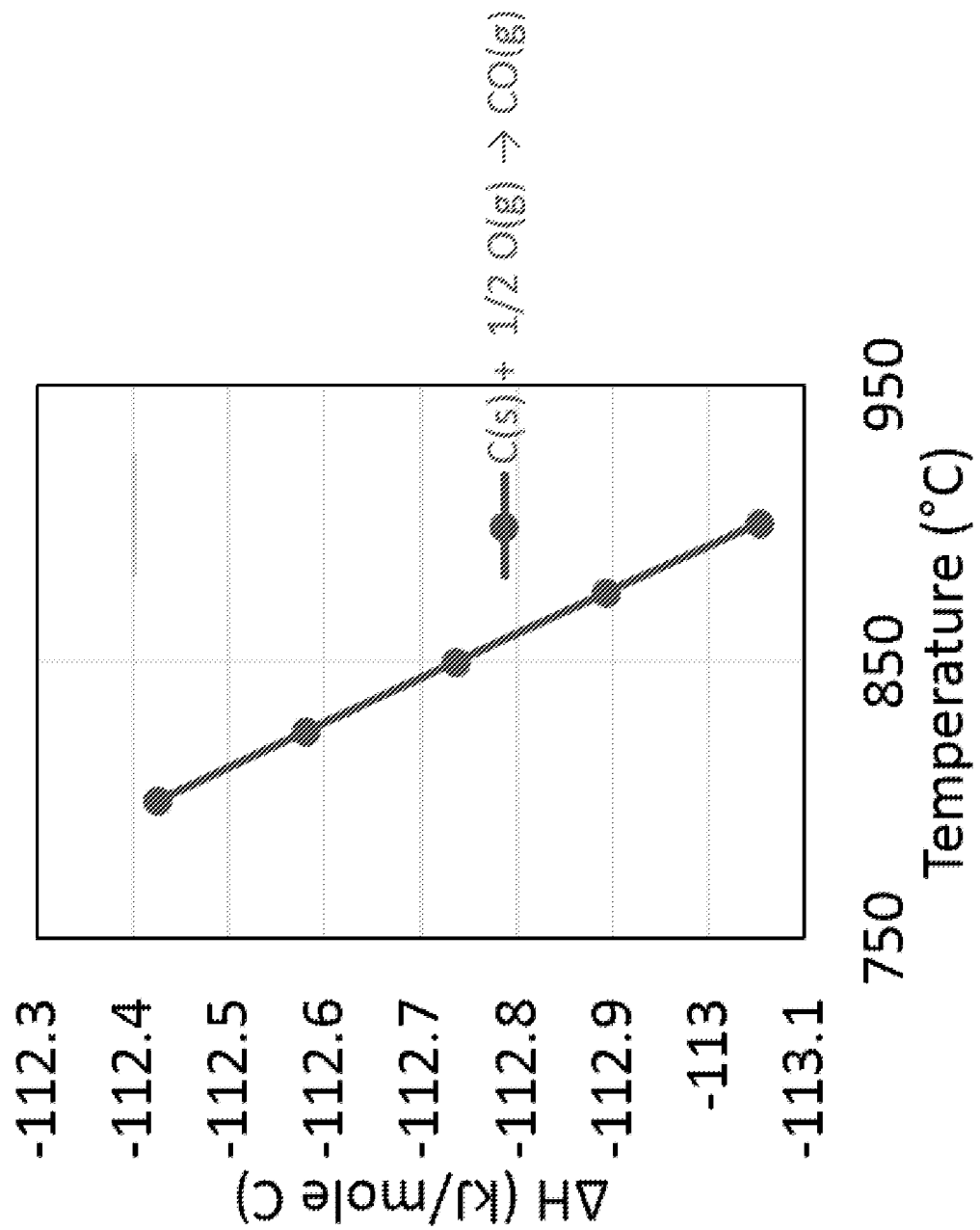
FIG. 9C depicts a graph illustrating heats of reactions for the carbon oxidation reaction to form CO.
Figure 10A:
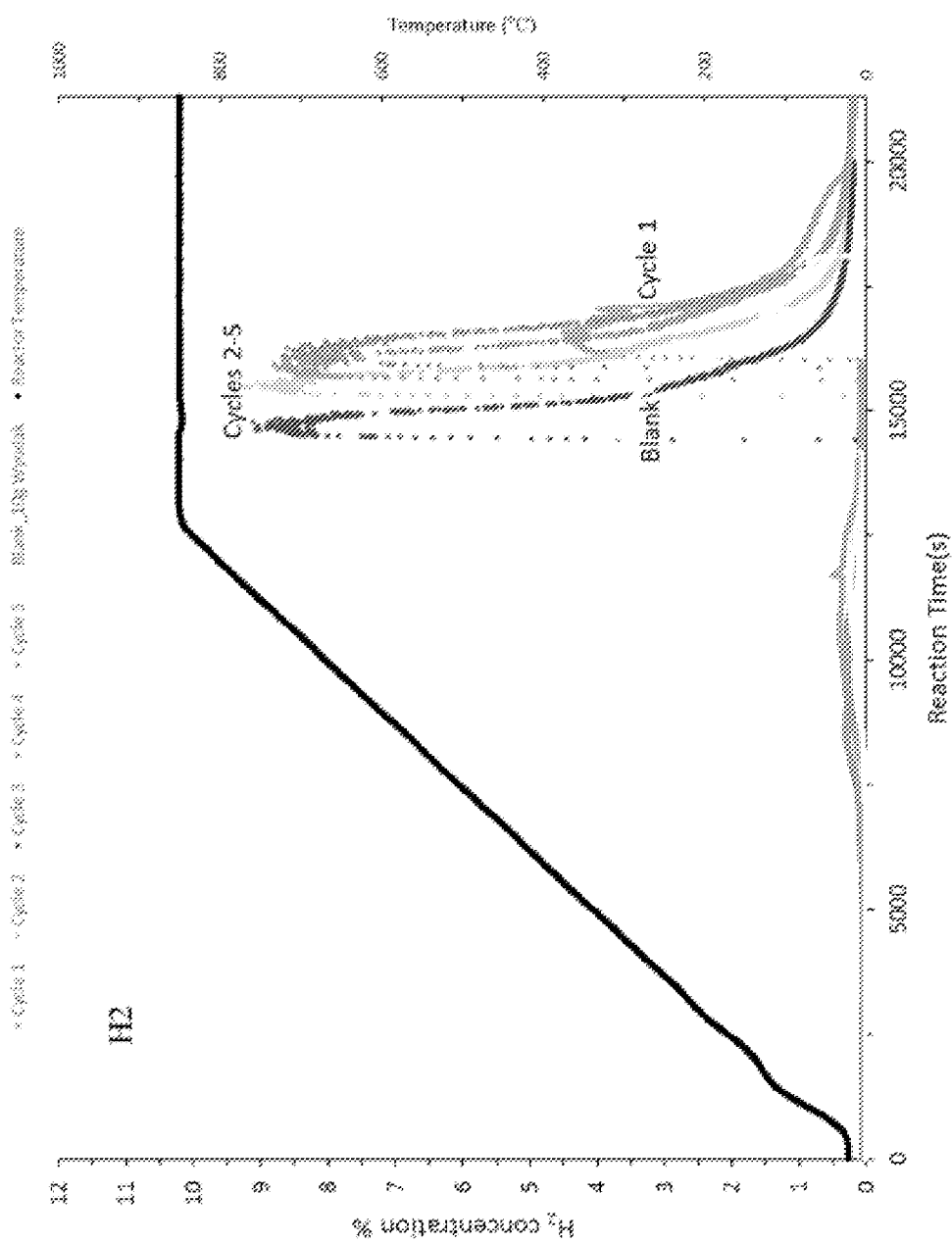
FIG. 10A depicts a graph illustrating the concentration of $H_2$ during cyclic additions of Wyodak coal/15% steam at 850° C. to Hematite mineral from Applied Minerals.
Figure 10B:
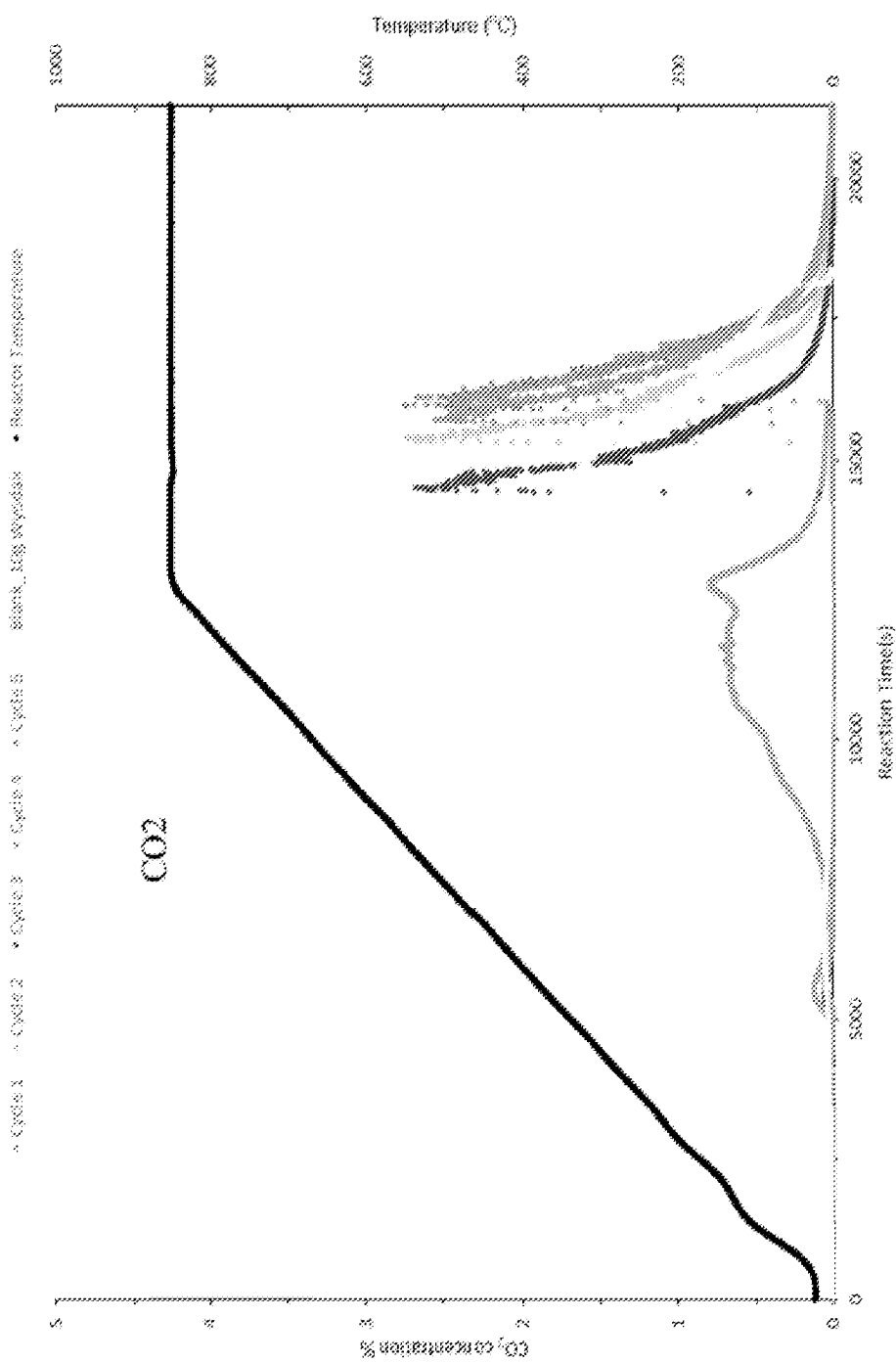
FIG. 10B depicts a graph illustrating the concentration of $CO_2$ during cyclic additions of Wyodak coal/15% steam at 850° C. to Hematite mineral from Applied Minerals.
Figure 10C:
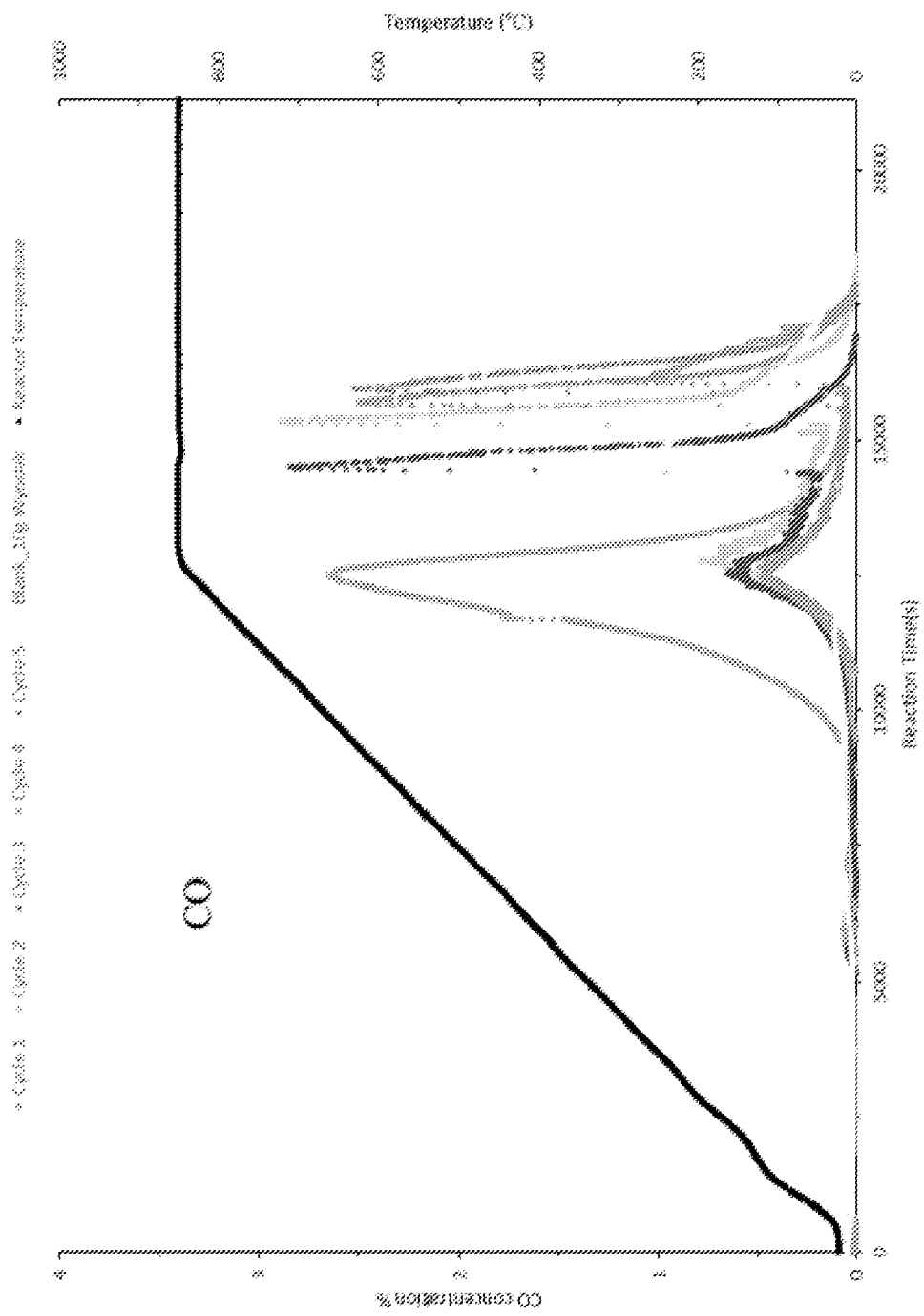
FIG. 10C depicts a graph illustrating the concentration of CO during cyclic additions of Wyodak coal/15% steam at 850° C. to Hematite mineral from Applied Minerals.
Figure 11A:
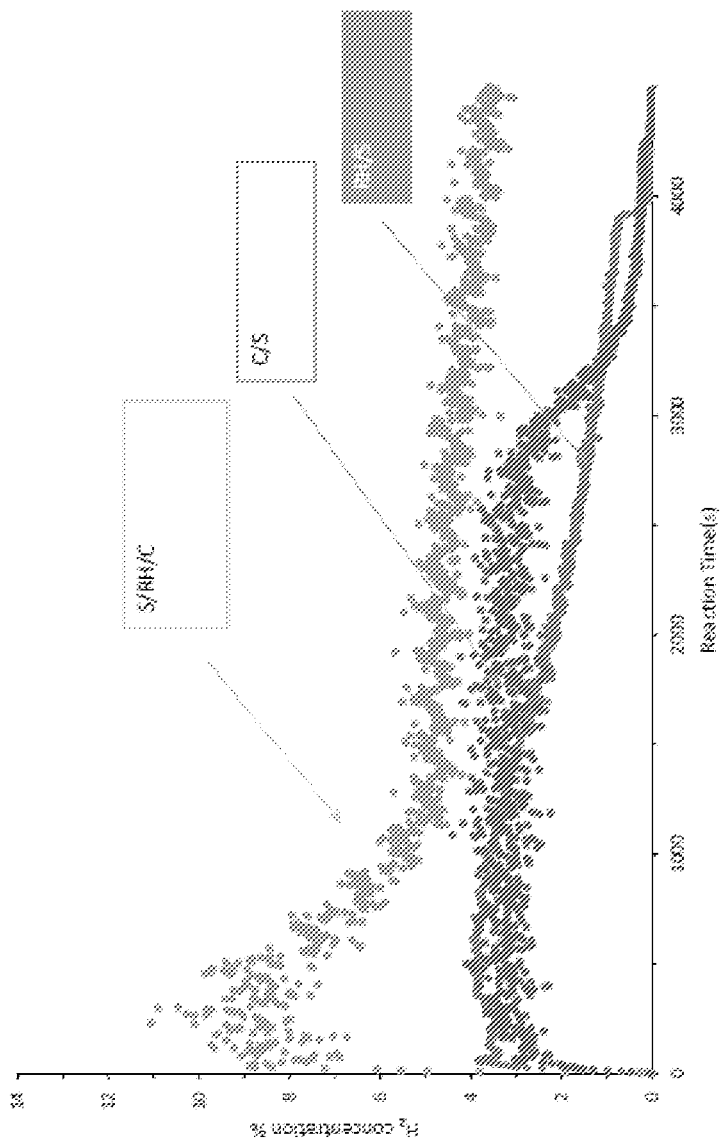
FIG. 11A depicts a graph illustrating the concentration of $H_2$ during the reaction of 15% steam (S) at 850° C. with (1) blank Wyodak coal (C/S), (2) fully reduced Cliffs hematite (RH/S) using $H_2$ with no coal and (3) fully reduced Cliffs hematite with coal (S/RH/C)
Figure 11B:
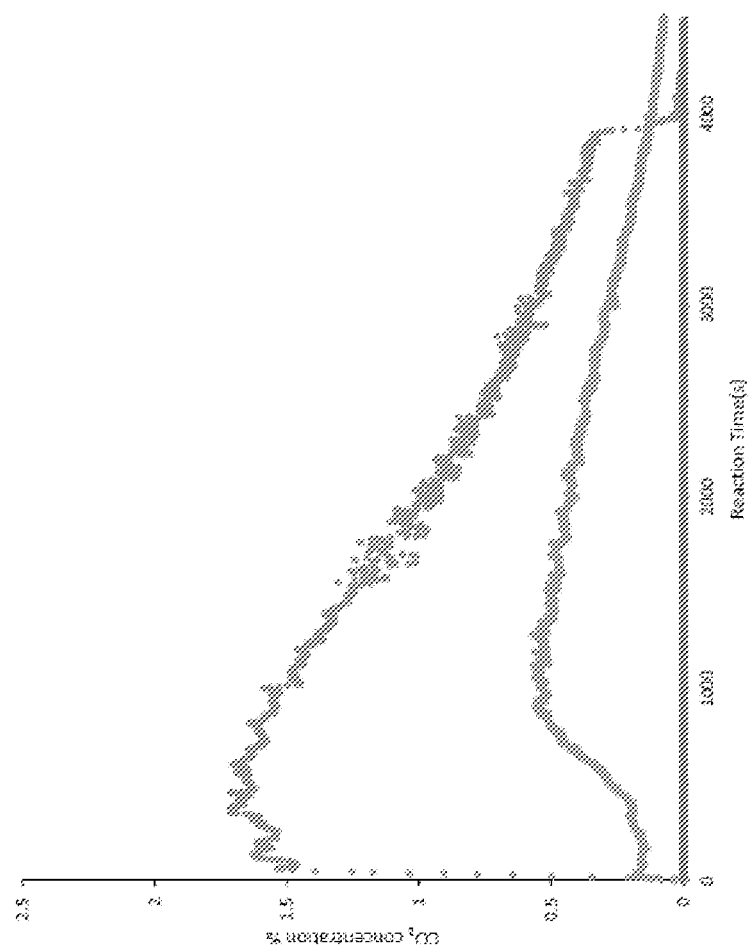
FIG. 11B depicts a graph illustrating the concentration of $CO_2$ during the reaction of 15% steam (S) at 850° C. with (1) blank Wyodak coal (C/S), (2) fully reduced Cliffs hematite using $H_2$ (RH/S) with no coal and (3) fully reduced Cliffs hematite with coal (S/RH/C)
Figure 11C:
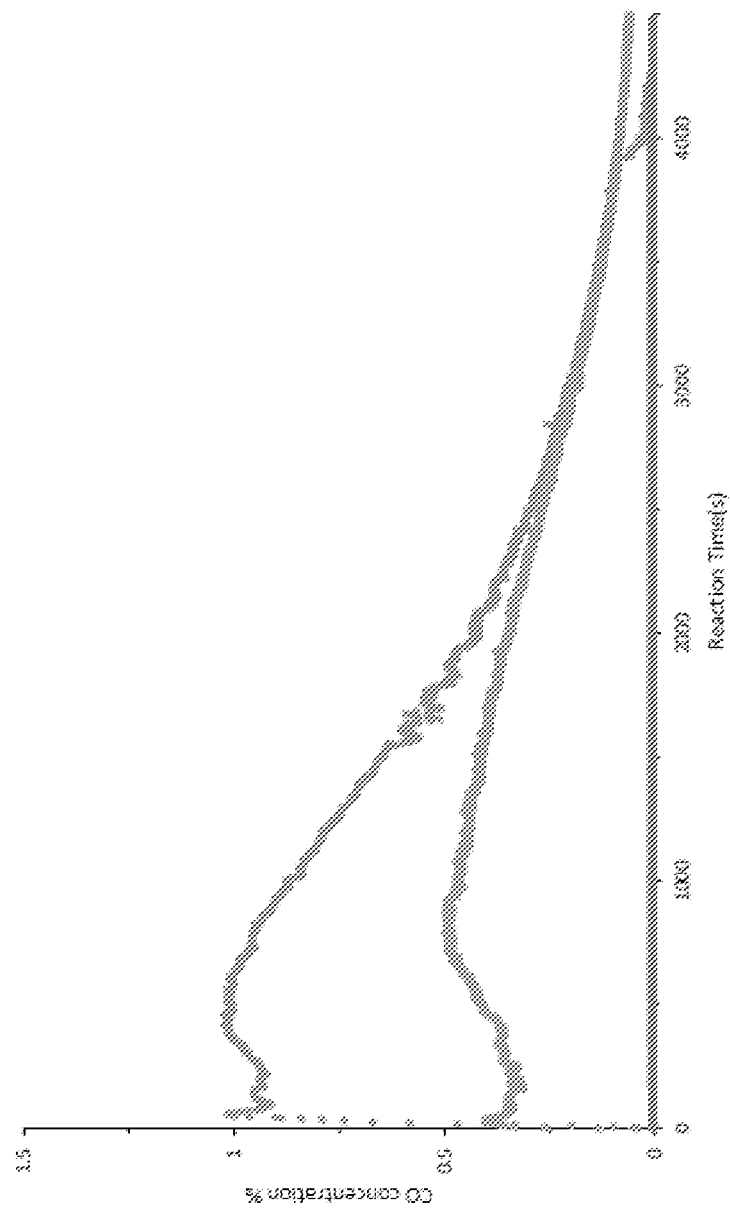
FIG. 11C depicts a graph illustrating the concentration of CO during the reaction of 15% steam (S) at 850° C. with (1) blank Wyodak coal (C/S), (2) fully' reduced Cliffs hematite using $H_2$ (RH/S) with no coal and (3) fully reduced Cliffs hematite with coal (S/RH/C)
Figure 11D:
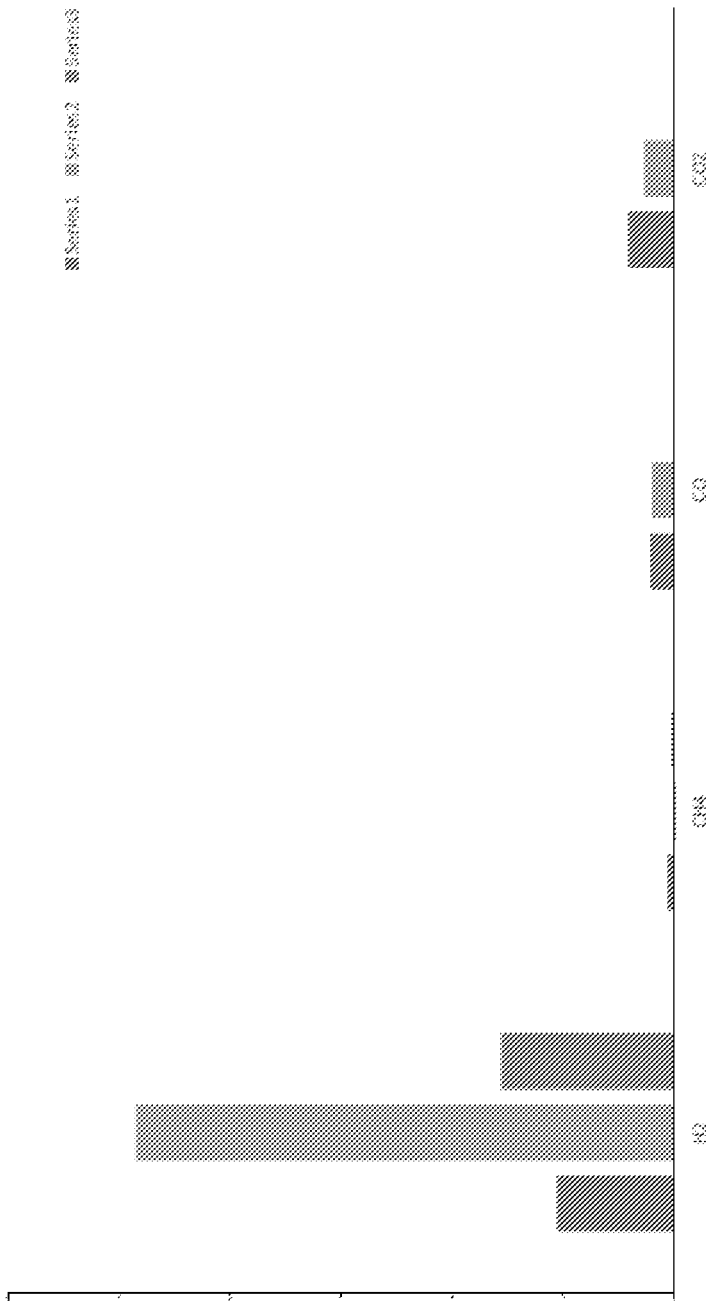
FIG. 11D depicts a graph illustrating the moles of gases formed during the reaction of 15% steam (S) at 850° C. with (1) blank Wyodak coal (C/S), (2) fully' reduced Cliffs hematite using $H_2$ (RH/S) with no coal and (3) fully reduced Cliffs hematite with coal (C/S)

FIGS. 9A-9C depict graphs illustrating heats of reactions for (a) water splitting reaction (b)carbon oxidation to form CO$_2$ (c)carbon oxidation to form CO reactions.

X-Ray photoelectron spectroscopy (XPS) which is a surface analysis (50 A of the surface) technique was conducted to determine the elemental and oxidation changes of CuO—Fe$_2$O$_3$-Alumina after reactions with coal/steam. XPS data of the fresh material showed the presence of Cu$^{+2}$ and Fe$^{+3}$ and the reacted CuO—Fe$_2$O$_3$-Alumina with both Wyodak and Illinois #6 coal had Cu$^0$, Cu$^{+1}$, Fe$^{+2}$, Fe$^{+3}$ species.

TPR experiments in the Fluidized bed reactor was also performed with natural mineral hematite (Fe$_2$O$_3$). TPR was performed with 20 g of Wyodak coal/Applied minerals hematite in cycle 1 with 15% steam addition at 850° C. and TPR cycles were repeated with anew 10 g coal sample/steam at each cycle for five more cycles. Blank experiment was also conducted with coal/steam without the oxygen carrier. The concentrations of gases produced are shown in FIGS. 10A-10D. Continued production of H$_2$ with higher rates than that with blank coal was observed with coal/reduced hematite/steam.

H$_2$ was used as the fuel for the initial reduction with Cliffs natural mineral hematite and then Wyodak/coal/steam TPR was conducted to determine the H$_2$ production. Hematite was fully reduced with 10% H$_2$ in He at 700° C. Then the reduced oxygen carrier was cooled to ambient temperature, 10 g of coal was added and temperature ramp was performed up to 850° C. with 15% steam addition at 850° C. The results are shown in FIG. 11A-11D. For comparison, two blank experiments were also conducted: first blank experiment using coal without the oxygen carrier and 15% steam at 850° C., and the second blank experiment with fully reduced oxygen carrier and 15% steam at 850° C. As shown in FIG. 11A-11D, there was some H$_2$ formation with the fully reduced hematite/steam which is different from that was observed with CuO—Fe$_2$O$_3$-Alumina indicating there was H$_2$ production by the water splitting reaction at 850° C. with fully reduced hematite. However, the H$_2$ formation was higher with the coal/fully reduced oxygen carrier/steam than that with water splitting reaction with steam/fully reduced hematite indicating that coal is promoting additional H$_2$ formation.

Figure 12A:
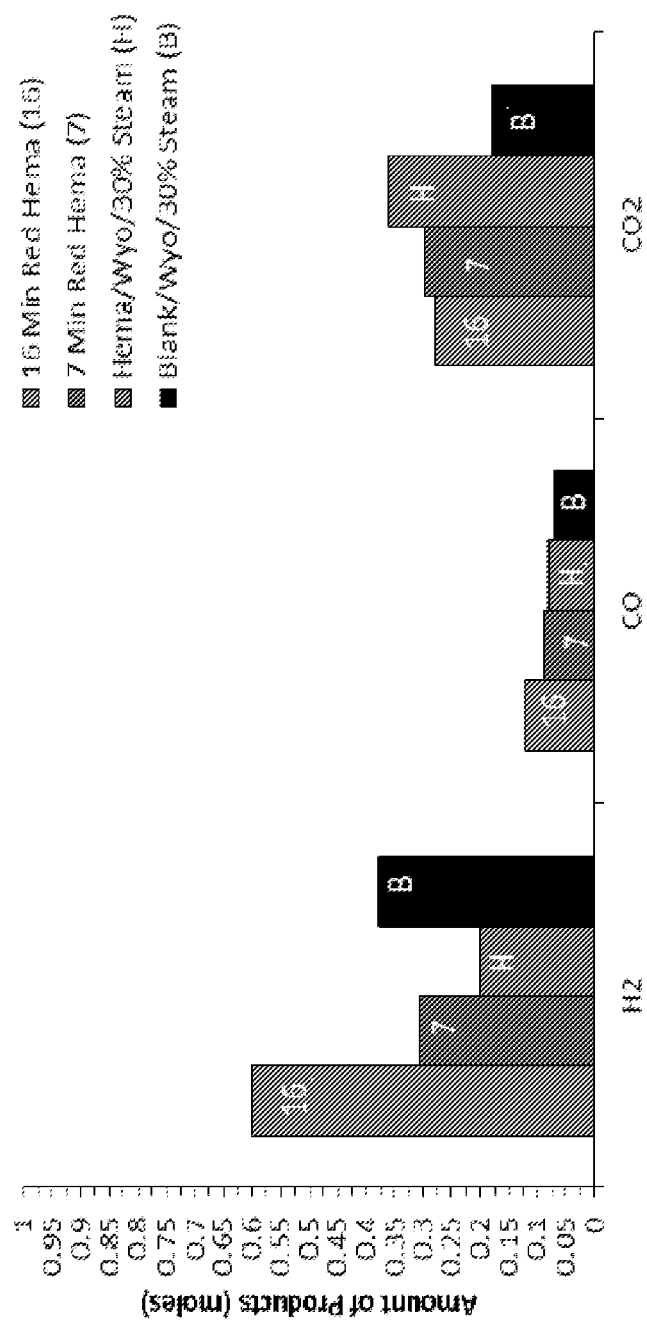
FIG. 12A depicts a graph illustrating the moles of product gases during the temperature ramp (RT–850° C.) of coal/steam/Cliffs hematite after reductions with methane for 0, 7 and 16 mins and a blank test with coal/steam without hematite.
Figure 12B:
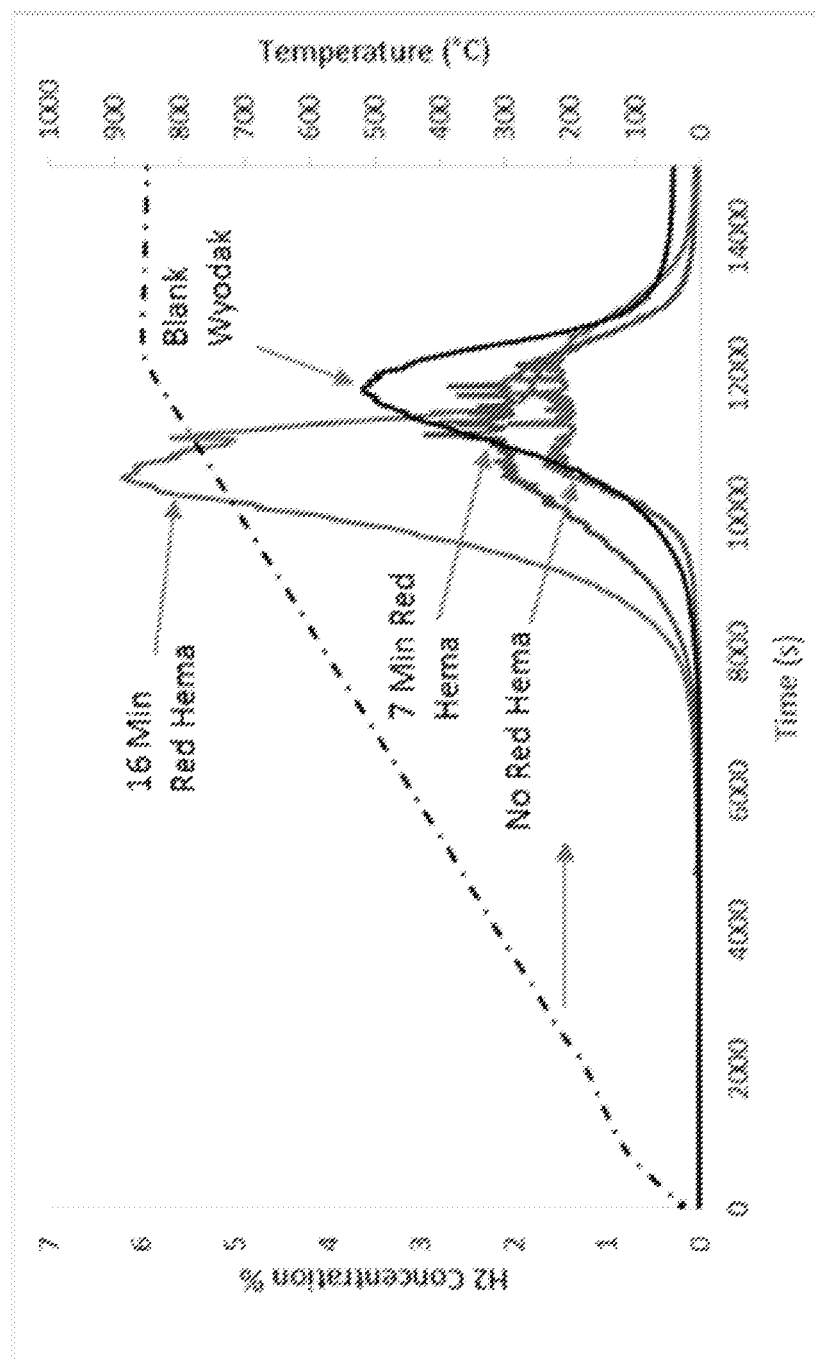
FIG. 12B depicts a graph illustrating the $H_2$ concentrations during the temperature ramp (RT-850° C.) of coal/steam/Cliffs hematite after reductions with methane for 0, 7 and 16 mins and a blank test with coal/steam without hematite.
Figure 12C:
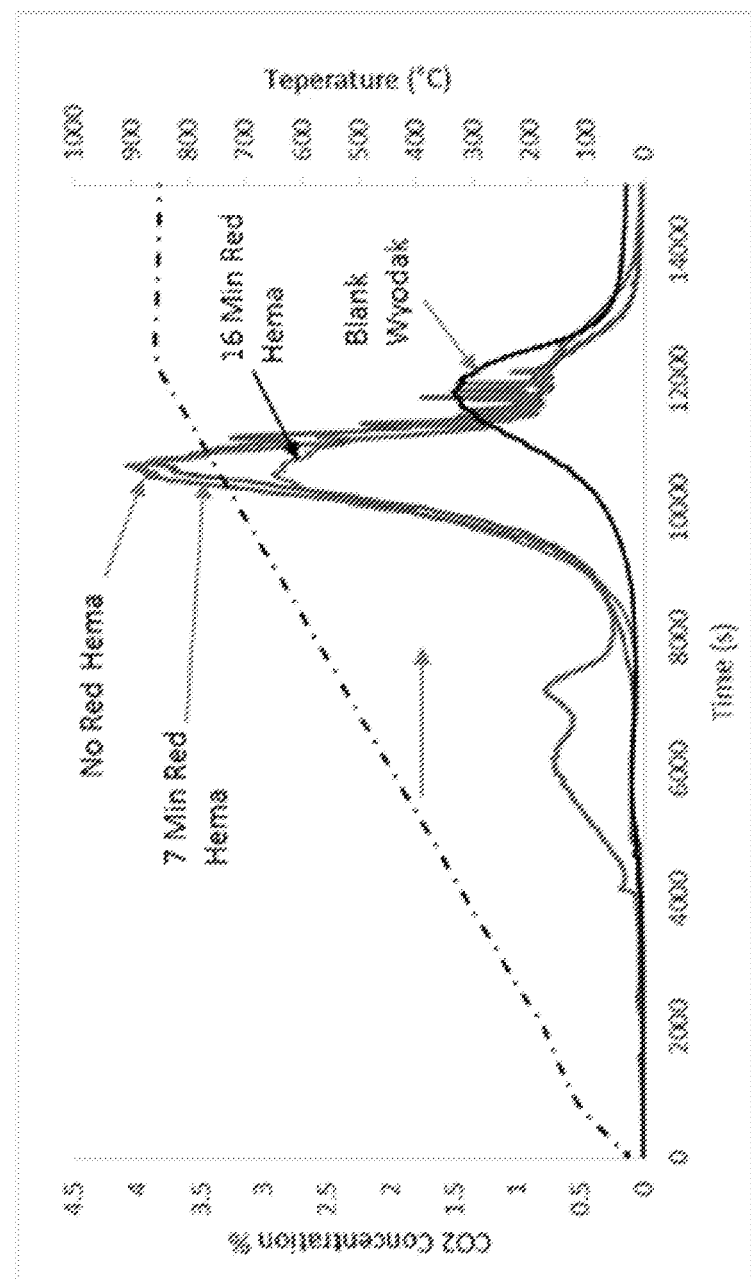
FIG. 12C depicts a graph illustrating the $CO_2$ concentrations during the temperature ramp (RT-850° C.) of coal/steam/Cliffs hematite after reductions with methane for 0, 7 and 16 mins and a blank test with coal/steam without hematite.

Methane was used for the initial reduction step with Cliffs natural mineral hematite. Reduction time was changed to obtain different extents of reduction. The data with reduced hematite/coal/steam are shown in FIG. 12A-12C and the data indicated that the H$^2$ production rates increased with increasing extent of reduction of hematite.

The process described herein differs from the catalytic coal gasification process reported in the literature in which coal is impregnated with solutions containing the catalysts such as alkali and iron salts. The process described herein was conducted in a fluidized bed reactor and the contact between the reduced metal oxide and coal was minimal. Coal may be added to the reactor continuously which makes the operation very easy unlike the catalytic gasification in which the coal must be impregnated with catalyst solution.

These data also indicated that the H$_2$ rich syngas production process herein with coal/steam/reduced oxygen carrier could not have been proceeded via WGS shift reaction. When coal/steam was introduced to the reduced oxygen carrier, rates of production of H$_2$, CO$_2$ and CO increased simultaneously (FIG. 8A-8D). If syngas produced by coal/steam was converted by WGS to CO$_2$ and H$_2$, there should be a decrease in the CO with a corresponding increase in H$_2$ and CO but this did not occur. In addition, during the steam introduction at 300-850° C., H$_2$, CO$_2$ and CO concentration maxima with reduced CuO—Fe$_2$O$_3$-Alumina/coal/steam occurred at a lower temperature than that with coal steam gasification without the oxygen carrier (FIG. 4A-4D).

Therefore, the likely mechanism for enhanced H$_2$ production with reduced oxygen carrier by coal/steam is due to enhancement of reaction [3] which also contributes to 2 moles of H$_2$ for every CO$_2$ mole. When steam concentration was 30 vol. % there was more CO$_2$ than that with 15 vol. %. With more steam, reaction [3] appears to be the dominant reaction.

It is possible that, the sulfur released from coal may react with the reduced oxygen carrier and sulfur may be removed as SO$_2$ by oxidizing the oxygen carrier and the SO$_2$ stream may be processed using traditional SO$_2$ removal processes or may be used for CaSO$_4$ production. Ash generated in the process will be mixed with the reduced metal oxide and ash may be removed by density separation or magnetic separation.

Embodiments relate to a method for producing an H$_2$ stream free of nitrogen from coal, the method comprising an oxygen carrier at least partially reduced using a fuel in a reactor forming a reduced metal oxide comprised of first series—3d block-transition metals or mixture thereof. The reduced metal oxide is reacted with the solid fuel/steam to produce H$_2$ and CO$_2$/CO in the reactor; and the reduced metal oxide is added separately or simultaneously with a solid fuel while not impregnating the solid fuel with the reduced metal oxide.

Embodiments may include the metal oxide comprises the first series—3d block-transition metal (T) oxide or mixed metal oxides such as T$_x$O$_y$—Z$_p$O$_q$ or Z$_p$T$_x$O$_y$ where Z is a single or mixed metal oxide selected from transition metals, alkali, alkali earth metals or Ce, Zr, V, Mo, Sn and x>0, y>0, P>0, Q>0; the metal oxide comprises a hematite or CuO—Fe$_2$O$_3$ mixture which may be reduced to Cu$^{+1}$, Cu$^0$, Fe$^0$, Fe$^{+2}$, Fe$^{+3}$; and/or the reduced metal oxide comprises reduced forms of transition metal oxides, alkali metal oxides and Ce, Zr, V, Mo, Sn.

Embodiments includes an inert support may be combined with the metal oxide, wherein the inert support comprises from about 5 wt. % to about 60 wt. % of the metal oxide and the inert support may comprise alumina, silica, alumina silicates, clay, titania, or mixtures thereof. The inert support may interact to form compounds with metal oxides forming aluminates, silicates, titanates of transition metals such as iron aluminates and copper aluminates.

Embodiments may include the solid fuel comprises coal, coke, char.biomass or bio fuel; or the fuel used for the initial reduction of the metal oxide comprises methane, hydrogen, syngas, coal, coke, char, bio mass, or biofuel.

One or more embodiments include the H$_2$ rich syngas product stream is at least >50% vol. of H$_2$ and CO. The reactor may comprise a fluidized bed, fixed bed, moving bed or spout bed. The reaction temperature of the reduced metal, coal and steam is greater than 500° C. Further the steam required for the process is generated from heat from a chemical looping combustion of fuel with metal oxide.

Still other embodiments relate to a method for producing syngas from reduced metal oxide/steam/solid fuel combined with heat from a chemical looping combustion of metal oxide wherein the process comprises reducing the metal oxide or oxygen carrier selected from a transition metal oxides or a mixture there of with a gaseous or solid fuel in the fuel reactor; transferring some portion of the reduced metal oxide from a fuel reactor to a catalytic reactor; supplying steam and solid fuel to the catalytic reactor containing the reduced metal oxide to produce $H_2$ rich syngas; transferring some portion the reduced carrier from the fuel reactor to an oxidizing reactor; supplying the oxidizing gas to the oxidizing reactor, thereby generating heat and a re-oxidized oxygen carrier; transferring heat from the oxidizing reactor to the catalytic reactor; and transferring the re-oxidized oxygen carrier from oxidizing reactor to the fuel reactor.

Yet another embodiment relates to a method of producing synthesis gas rich of hydrogen from sold carbonaceous fuel comprising delivering a metal oxide to a reactor, where the metal oxide comprises iron oxide, $CuO$—$Fe_2O_3$, $CuO$—$Fe_2O_3$-Alumina or thereof>5 wt. %; partially or fully reducing the metal oxide with a solid or gaseous fuel; delivering a solid fuel to the reactor; delivering steam to the reactor; converting some portion of the solid fuel and the steam to a hydrogen rich synthesis gas and maintaining the reactor above 500° C.; continuing the delivery of steam and solid fuel to the reactor; and withdrawing product stream from the reactor, where the gaseous product comprises product stream, and where at least >50 vol. % of the product stream consists of $H_2$ and CO.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

I claim:

1. A method for producing a syngas from a reduced metal aluminate catalyst, a steam, and a solid fuel consisting of:
   reducing the metal aluminate catalyst selected from one or more transition metal aluminates using the solid fuel for producing the reduced metal aluminate catalyst, wherein the one or more transition metal aluminates is selected from the group consisting of $Cu^{+1}$, $Cu^0$, and $Fe^{+2}$,
   continuously delivering the steam and the solid fuel to the reduced metal aluminate catalyst; and
   supplying a heat for producing a continuous stream of syngas, wherein the syngas comprises a product stream consisting of at least >than 50 vol % of $H_2$ and CO,
   wherein the solid fuel consisting of a solid carbonaceous fuel selected from the group consisting of a coal, coke, char biomass and biofuel, and
   wherein a reaction temperature for producing the syngas from the reduced metal aluminate catalyst, the stream and the solid fuel are greater than 500° C.

2. The method of claim 1, wherein supplying the heat is by a combustion of at least one or more of a fuel, a chemical looping combustion, a microwave heating source and a solar energy.

3. The method of claim 1, further comprising a reactor, wherein the reactor comprises a fluidized bed, a fixed bed, a moving bed or a spouted bed.

* * * * *